United States Patent
Pursifull et al.

(10) Patent No.: US 9,359,923 B2
(45) Date of Patent: Jun. 7, 2016

(54) METHOD AND SYSTEM FOR FUEL VAPOR MANAGEMENT

(71) Applicant: Ford Global Technologies, LLC, Dearborn, MI (US)

(72) Inventors: Ross Dykstra Pursifull, Dearborn, MI (US); Joseph Norman Ulrey, Dearborn, MI (US); Katherine Jane Brewer, Belleville, MI (US); Mark Steadman, Bromley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/793,082

(22) Filed: Jul. 7, 2015

(65) Prior Publication Data

US 2015/0308310 A1     Oct. 29, 2015

Related U.S. Application Data

(63) Continuation-in-part of application No. 13/660,884, filed on Oct. 25, 2012.

(51) Int. Cl.
| | | |
|---|---|---|
| F01M 13/00 | (2006.01) |
| F01M 13/02 | (2006.01) |
| F02M 35/10 | (2006.01) |
| F02D 41/00 | (2006.01) |
| F02B 37/12 | (2006.01) |
| F02B 37/16 | (2006.01) |
| F02M 25/08 | (2006.01) |

(52) U.S. Cl.
CPC .............. *F01M 13/021* (2013.01); *F01M 13/02* (2013.01); *F01M 13/022* (2013.01); *F01M 13/023* (2013.01); *F02B 37/127* (2013.01); *F02B 37/164* (2013.01); *F02D 41/003* (2013.01); *F02M 25/08* (2013.01); *F02M 35/10229* (2013.01); *F01M 2013/027* (2013.01); *Y02T 10/144* (2013.01)

(58) Field of Classification Search
CPC . F01M 13/021; F01M 13/022; F01M 13/023; F01M 13/025; F01M 2013/027; F02B 37/16; F02B 37/164; F02B 37/127; F02B 2037/162
USPC .......................... 123/520, 562–566, 572, 574
See application file for complete search history.

(56) References Cited

U.S. PATENT DOCUMENTS

| | | | |
|---|---|---|---|
| 4,318,374 A | | 3/1982 | Yasuhara |
| 4,557,226 A | * | 12/1985 | Mayer .................... F01M 13/00 123/41.86 |
| 5,005,550 A | | 4/1991 | Bugin, Jr. et al. |

(Continued)

FOREIGN PATENT DOCUMENTS

| | | |
|---|---|---|
| EP | 1959117 A1 | 8/2008 |
| EP | 2182185 A1 | 5/2010 |

(Continued)

*Primary Examiner* — Erick Solis

(74) *Attorney, Agent, or Firm* — Julia Voutyras; Alleman Hall McCoy Russell & Tuttle LLP

(57) ABSTRACT

Methods and systems are provided for ventilating a crankcase in an engine. In one example, when the engine is operating boosted under cruising conditions, fuel vapors from the crankcase may flow to each of a compressor inlet and an intake manifold of the engine. In this way, the crankcase may be effectively purged.

19 Claims, 10 Drawing Sheets

(56) References Cited

U.S. PATENT DOCUMENTS

| | | |
|---|---|---|
| 5,140,968 A | 8/1992 | Doan |
| 5,349,935 A | 9/1994 | Mezger et al. |
| 5,499,616 A | 3/1996 | Enright |
| 5,592,923 A | 1/1997 | Machida |
| 5,629,477 A | 5/1997 | Ito |
| 5,722,376 A | 3/1998 | Sweeten |
| 6,016,460 A | 1/2000 | Olin et al. |
| 6,047,670 A | 4/2000 | Stella et al. |
| 6,052,644 A | 4/2000 | Murakami et al. |
| 6,098,603 A | 8/2000 | Maegawa et al. |
| 6,575,022 B1 | 6/2003 | Schneider et al. |
| 6,666,192 B2 | 12/2003 | Rodriguez et al. |
| 6,670,067 B2 | 12/2003 | Sato et al. |
| 6,688,104 B2 | 2/2004 | Baeuerle et al. |
| 6,712,049 B2 | 3/2004 | Kawano |
| 6,779,388 B2 | 8/2004 | Baeuerle et al. |
| 6,804,995 B2 | 10/2004 | Kawano |
| 6,832,147 B2 | 12/2004 | Vornehm et al. |
| 6,910,467 B2 | 6/2005 | Murakami et al. |
| 7,007,682 B2 | 3/2006 | Takahashi et al. |
| 7,011,690 B2 | 3/2006 | Altvater et al. |
| 7,080,547 B2 | 7/2006 | Beyer et al. |
| 7,212,905 B2 | 5/2007 | Grill |
| 7,275,527 B2 | 10/2007 | Bruchner et al. |
| 7,316,223 B2 | 1/2008 | Wakahara |
| 7,320,315 B2 | 1/2008 | Amano et al. |
| 7,431,023 B2 | 10/2008 | Kananagh et al. |
| 7,523,748 B2 | 4/2009 | Hirano et al. |
| 7,743,752 B2 | 6/2010 | Kerns et al. |
| 7,810,475 B2 | 10/2010 | Peters et al. |
| 7,886,727 B2 | 2/2011 | Ulrey et al. |
| 7,966,996 B1 | 6/2011 | Pursifull |
| 8,100,478 B2 | 1/2012 | Ellison |
| 8,109,259 B2 | 2/2012 | Ulrey et al. |
| 8,122,870 B2 | 2/2012 | Konohara |
| 8,312,765 B2 | 11/2012 | Pursifull et al. |
| 8,695,339 B2 * | 4/2014 | Spix ................. F02B 37/18 123/572 |
| 8,826,659 B2 | 9/2014 | Shieh |
| 8,960,167 B2 | 2/2015 | Hotta |
| 8,991,365 B2 * | 3/2015 | Konohara ............ F01M 13/022 123/559.1 |
| 9,068,486 B2 | 6/2015 | Rollinger et al. |
| 9,097,149 B2 | 8/2015 | Beshay et al. |
| 9,127,578 B2 | 9/2015 | Pursifull et al. |
| 9,127,976 B2 | 9/2015 | Pursifull et al. |
| 2001/0022175 A1 * | 9/2001 | Moren ................. F01M 13/022 123/572 |
| 2002/0033157 A1 | 3/2002 | Thompson et al. |
| 2005/0000496 A1 * | 1/2005 | Norrick ................. F02M 25/06 123/563 |
| 2005/0015196 A1 | 1/2005 | Hawkins et al. |
| 2006/0011163 A1 | 1/2006 | Watanabe et al. |
| 2008/0173284 A1 | 7/2008 | Kavanagh et al. |
| 2009/0090337 A1 | 4/2009 | Asanuma et al. |
| 2009/0308364 A1 | 12/2009 | Konohara |
| 2009/0320809 A1 | 12/2009 | Ruppel et al. |
| 2010/0089345 A1 | 4/2010 | Kim et al. |
| 2010/0139585 A1 | 6/2010 | Frazier, Jr. |
| 2010/0147270 A1 | 6/2010 | Pursifull et al. |
| 2010/0180872 A1 | 7/2010 | Monros |
| 2011/0132311 A1 | 6/2011 | Pursifull et al. |
| 2012/0247438 A1 * | 10/2012 | Konohara ............ F01M 13/022 123/559.1 |
| 2013/0025564 A1 | 1/2013 | Setiadi |
| 2014/0081550 A1 | 3/2014 | Jentz et al. |
| 2014/0081564 A1 | 3/2014 | Pursifull et al. |
| 2014/0116399 A1 | 5/2014 | Ulrey et al. |
| 2014/0137839 A1 | 5/2014 | Russ |
| 2014/0138562 A1 | 5/2014 | Rollinger et al. |
| 2014/0224232 A1 * | 8/2014 | Hotta ................. F01M 13/0011 123/574 |
| 2014/0318514 A1 | 10/2014 | Pursifull |

FOREIGN PATENT DOCUMENTS

| | | |
|---|---|---|
| WO | 2009116063 A2 | 9/2009 |
| WO | 2014060831 A2 | 4/2014 |

* cited by examiner

METHOD AND SYSTEM FOR FUEL VAPOR MANAGEMENT

CROSS REFERENCE TO RELATED APPLICATIONS

The present application is a continuation-in-part of U.S. patent application Ser. No. 13/660,884, "METHOD AND SYSTEM FOR FUEL VAPOR MANAGEMENT," filed on Oct. 25, 2012, the entire contents of which are hereby incorporated by reference for all purposes.

FIELD

The present application relates to methods for controlling crankcase ventilation in boosted engines.

BACKGROUND/SUMMARY

Vehicle emission control systems may be configured to store fuel vapors from fuel tank refueling and diurnal engine operations in a charcoal canister. During a subsequent engine operation, the stored vapors can be purged into the engine where they are combusted. Various approaches may be used to generate vacuum for drawing in the fuel vapors. For example, an intake manifold vacuum generated during engine spinning can be used to draw in the stored fuel vapors. As another example, boosted intake air may be directly or indirectly used to purge the fuel vapors. Yet another example approach is shown by Ulrey et al. in U.S. Pat. No. 8,109,259. Therein, compressed air is directed through a crankcase to yield a crankcase effluent. Then, crankcase effluent is combined with the effluent from the canister which includes the stored fuel vapors. The combined effluent is then purged to the engine intake.

The inventors herein have recognized that such approaches may have limited performance during conditions when manifold pressure (or MAP) is at or near atmospheric conditions (or BP). In particular, during such conditions, the amount of vacuum available for purging the fuel vapors may be low, leading to a large vacuum valley. The reduction in the amount of purge vacuum available may lead to incomplete purging and degraded emissions. Further, in some examples, fuel economy may be sacrificed in order to increase vacuum for fuel purging, e.g. by forcing an engine re-start on an HEV by reducing use of variable camshaft timing or variable valve lift. Still other approaches may employ electric pumps for vapor purge in order to avoid this fuel economy penalty. However, such pumps may be expensive, and the electricity to power them may increase parasitic loads which degrade fuel economy. Further, during conditions when boost pressure is lower, compressed air may not be adequate to purge the crankcase.

In one example, some of the above issues may be at least partly addressed by a method for a boosted engine comprising: during boosted conditions, drawing vacuum at a first aspirator using compressor bypass flow. Then, during non-boosted conditions, the method includes enhancing intake manifold vacuum by drawing vacuum at a second aspirator using intake throttle bypass flow. Further, during both conditions, the method includes applying the drawn vacuum to purge fuel vapors from each of a canister and a crankcase to the intake manifold. In this way, one or more aspirators can be used to enhance low intake manifold vacuum and improve purging efficiency.

In another example, a method for a boosted engine may comprise, during boosted conditions, generating a vacuum at a first ejector using compressor bypass air flow, applying the vacuum to a crankcase to draw fuel vapors into the first ejector, and during cruising conditions and while drawing the vapors to the first ejector, flowing additional fuel vapors from the crankcase to the intake manifold via a crankcase ventilation valve. In this way, during lower boost conditions, additional fuel vapors from the crankcase may be purged.

As an example, during non-boosted conditions, fuel vapors (from a fuel tank) previously stored in a canister may be drawn into an engine intake along with fuel vapors from a crankcase. In particular, both the canister vapors and the crankcase gases may be drawn into the intake manifold in a first, common direction using intake manifold vacuum. Optionally, the intake manifold vacuum may be enhanced (e.g., when manifold pressure is substantially at atmospheric pressure) by flowing at least a portion of intake air through an aspirator coupled in a throttle bypass and drawing additional vacuum at the aspirator. Alternatively, the intake manifold vacuum may be harnessed by flowing crankcase gases through an aspirator and drawing additional vacuum at the aspirator. In this way, throttle bypass flow is used to draw in the fuel vapors during non-boosted conditions.

During boosted conditions, fuel vapors from the canister and the crankcase may be drawn into a compressor inlet using vacuum generated at an aspirator coupled in a compressor bypass. Therein, both the canister vapors and the crankcase gases may be drawn into the intake manifold via the compressor inlet in the first, common direction. In this way, compressor bypass flow is used to draw in the fuel vapors during boosted conditions.

Further, during boosted conditions with lower levels of boost, such as during cruising conditions, a shallow vacuum (e.g., manifold pressure lower than barometric within a threshold) may exist in the intake manifold. In these conditions, while fuel vapors from the crankcase may be drawn into the compressor inlet using vacuum generated at the aspirator coupled in the compressor bypass, additional fuel vapors may be drawn from the crankcase directly into the intake manifold using manifold vacuum.

In this way, one or more aspirators coupled to an engine system may be advantageously used to provide additional vacuum for purging canister and crankcase fuel vapors. By using throttle bypass flow or crankcase flow to generate vacuum at an aspirator during non-boosted conditions, intake manifold vacuum can be enhanced during conditions when a large vacuum valley would otherwise occur. By using a compressor bypass flow to generate vacuum at a different aspirator during boosted conditions, the generated vacuum can be used to draw the canister and crankcase fuel vapors into the intake manifold while flowing the vapors in the same direction as during non-boosted conditions. Further, the crankcase may be evacuated of fuel vapors even during conditions with lower boost. The common handling of fuel vapors from the canister and the crankcase, as well as the unidirectional flow of the vapors during both boosted and non-boosted conditions reduces system complexity and enables component reduction benefits to be achieved without degrading purging efficiency. For example, a single oil separator can be used at the crankcase. By using an existing air flow to generate a purging vacuum at the aspirators, the need for dedicated vacuum pumps is reduced, reducing related parasitic loads. Overall, emissions performance is improved without reducing fuel economy.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 9:
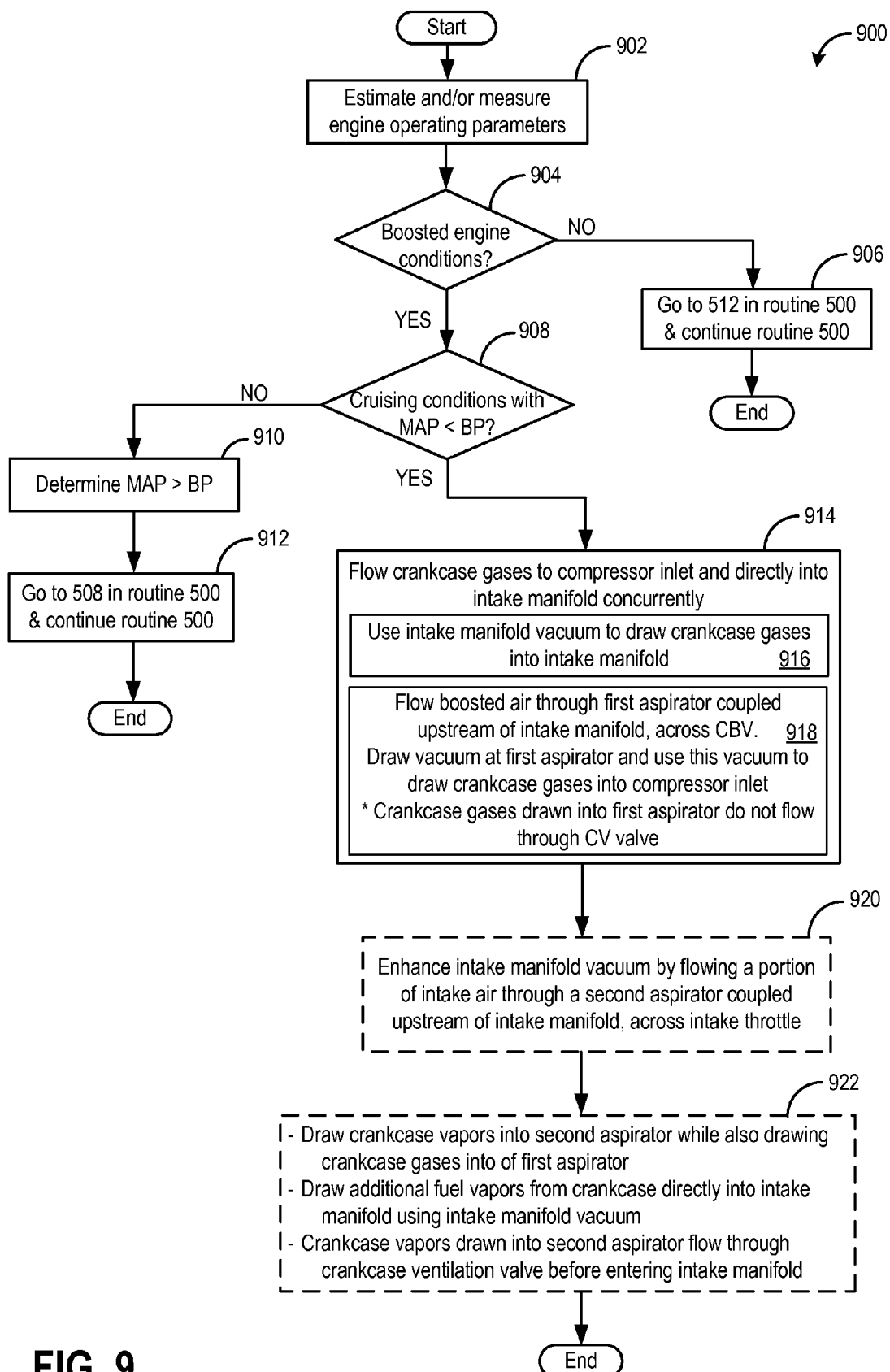
FIG. 9 shows an example method for crankcase ventilation during boosted engine operation under cruising conditions.
Figure 10:
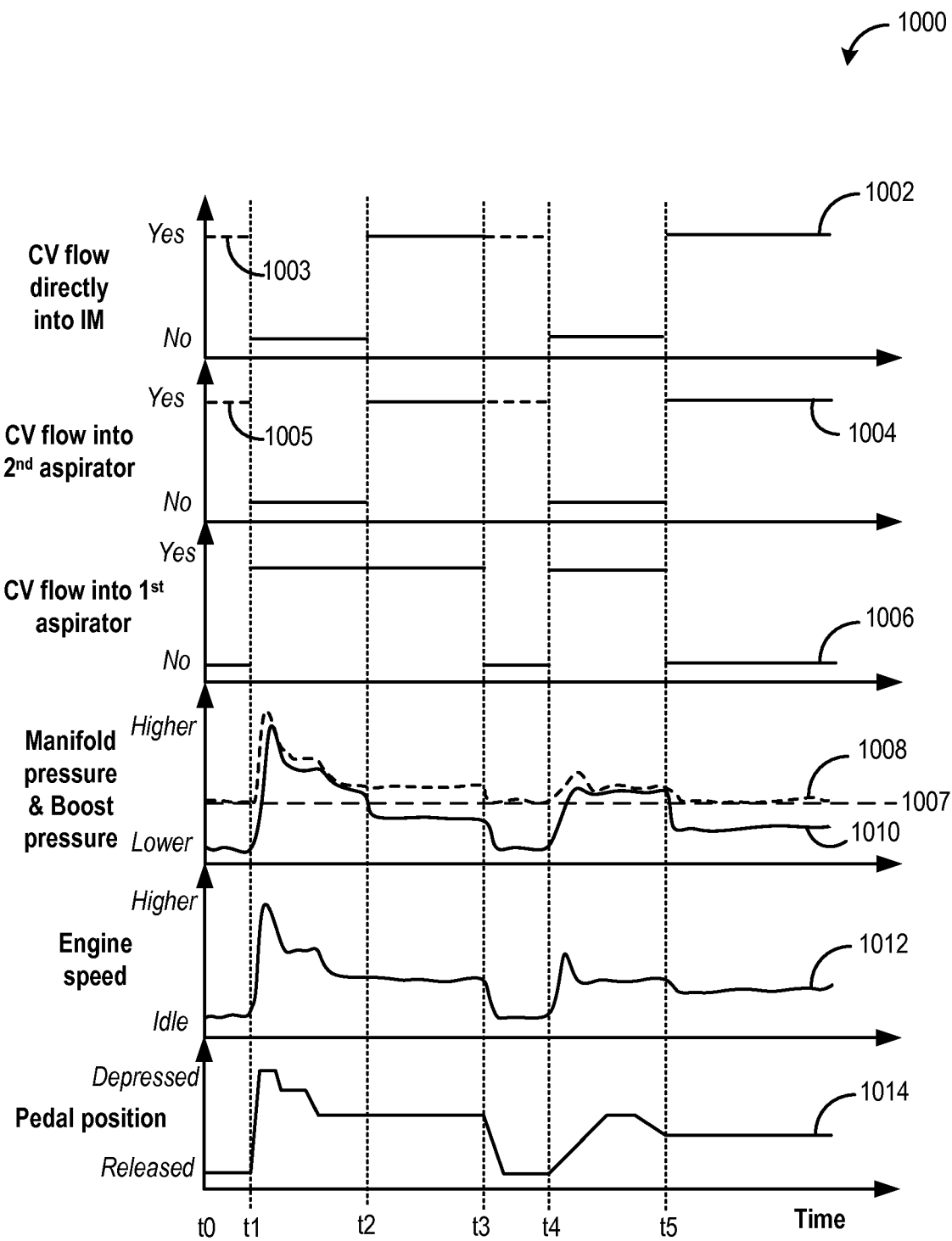
FIG. 10 depicts an example operation including crankcase ventilation during different engine conditions.

Methods and systems are provided for enhancing manifold vacuum during boosted and non-boosted engine operating conditions using vacuum generated at multiple aspirators coupled to an engine system (such as the aspirators and engine system of FIGS. 1-3, and 6-8). A controller may be configured to perform a control routine, such as the example routine of FIG. 5, to divert a portion of compressed air through a first aspirator during boosted conditions while diverting a portion of intake air through a second aspirator during non-boosted conditions to enhance vacuum generated for purging operations. Further, a crankcase flow can be harnessed through an aspirator to enhance an intake manifold vacuum. The enhanced vacuum may then be used to jointly draw fuel vapors from both a fuel system canister and a crankcase ventilation system. In this way, an intake manifold vacuum can be enhanced (FIG. 4) to improve purging efficiency. Further still, during conditions when engine boost is lowered, purging of a crankcase may occur simultaneously into a compressor inlet and into an intake manifold (FIG. 9). The engine system may be purged during boosted conditions, non-boosted conditions as well as conditions with lower boost (FIG. 10). By coordinating and combining fuel vapor purging with crankcase ventilation, synergistic benefits are achieved.

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
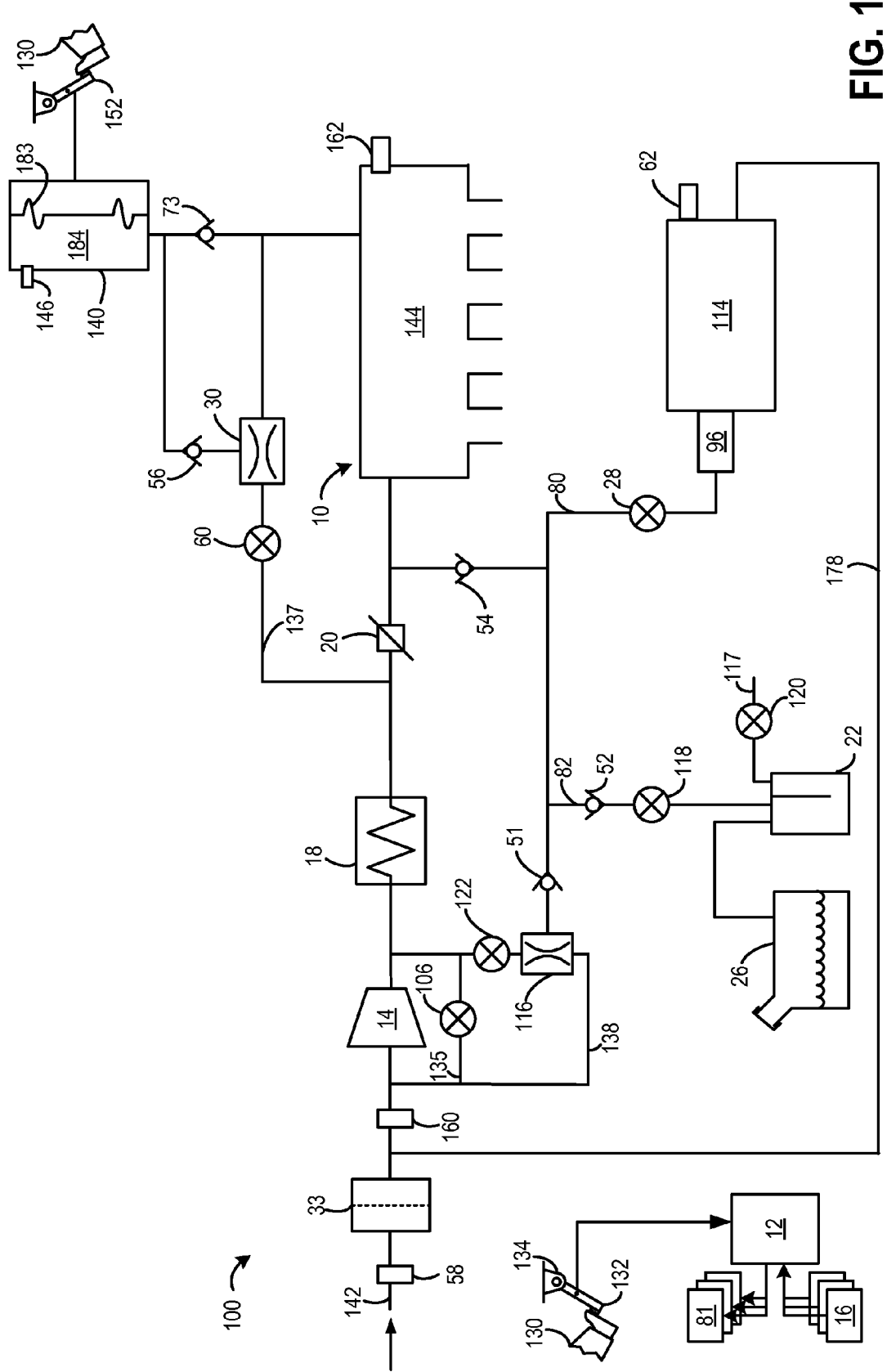
FIGS. 1-3 show example embodiments of an engine system configured for using multiple aspirators to enhance a manifold vacuum available for combined purging of fuel vapors from a fuel system and a crankcase ventilation system.

Referring now to FIG. 1, it shows aspects of an example engine system 100 for a motor vehicle. The engine system is configured for combusting fuel vapor accumulated in at least one component thereof. Engine system 100 includes a multi-cylinder internal combustion engine, generally depicted at 10, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 includes an air intake throttle 20 fluidly coupled to an engine intake manifold 144 along an intake passage 142. Air may enter intake passage 142 from an air intake system (AIS) including an air cleaner 33 in communication with the vehicle's environment. A position of throttle 20 may be varied by controller 12 via a signal provided to an electric motor or actuator included with the throttle 20, a configuration that is commonly referred to as electronic throttle control (ETC). In this manner, the throttle 20 may be operated to vary the intake air provided to intake manifold 144 and the plurality of cylinders therein. A mass air flow sensor 58 may be coupled in intake passage 142 for providing a signal regarding mass air flow (MAF). A manifold air pressure sensor 162 may be coupled to intake manifold 144 for providing a signal regarding manifold air pressure (MAP) to controller 12.

Engine system 100 may further include a turbocharger compressor 14 for providing a boosted intake aircharge to intake manifold 144. Compressor 14 may be mechanically coupled to and driven by a turbine powered by hot exhaust gas flowing from the engine. In the configuration illustrated in FIG. 1, the turbocharger compressor also draws fresh air from air cleaner 33 and flows compressed air through intercooler 18. The intercooler cools the compressed air, which then flows via throttle 20 to intake manifold 144.

A compressor bypass 135 may be coupled across compressor 14 to divert a portion of intake air compressed by compressor 14 back upstream of the compressor. An amount of air diverted through compressor bypass 135 may be controlled by opening compressor bypass valve (CBV) 106. By controlling CBV 106, and varying an amount of air diverted through the compressor bypass 135, a boost pressure provided downstream of the compressor can be regulated. This enables boost control and surge control. Further, regulation of the CBV 106 may de-pressurize the volume of air present between compressor 14 and throttle 20 to eliminate audible noise issues, etc. A compressor inlet pressure sensor 160 is coupled immediately upstream of the compressor for providing a signal regarding compressor inlet pressure (CIP) to controller 12.

A first aspirator 116 may be coupled to compressor bypass 135. In particular, first aspirator 116 may be positioned in a first conduit 138 coupled across compressor bypass 135. Thus, by varying an opening of CBV 106, an amount of compressed air diverted through compressor bypass 135 and first aspirator 116 may be varied. An aspirator may also be termed an ejector, a venturi, or a jet pump. As such, the ejector may be a passive vacuum generation device. In some embodiments, first conduit 138 may further include a first aspirator control valve 122 positioned upstream of an inlet of first aspirator 116 for varying a flow rate of air flowing through first aspirator 116. For example, during a boost pressure build-up period, first aspirator control valve 122 may be closed to expedite boost pressure build-up (and thereby reduce turbo lag). In comparison, by opening first aspirator control valve 122 when boost increase is not required, vacuum generation can be restored once sufficient boost pressure has been established. In one example, first aspirator control valve 122 is closed only when a vehicle operator initially (and heavily) applies an accelerator pedal. In this way, during boosted conditions, vacuum is drawn at the first aspirator using compress bypass flow. As such, if first aspirator control valve 122 was actuated open at all times, there may be a reduction in the rate of build of intake manifold pressure during a transient when maximum engine output is being requested.

Engine system 100 may include one or more vacuum consumption devices that are vacuum-actuated. As an example, engine system 100 may include a brake booster 140 coupled to vehicle wheel brakes (not shown). Brake booster 140, including a brake booster vacuum reservoir 184, may be coupled to intake manifold 144 via check valve 73. Check valve 73 allows air to flow to intake manifold 144 from brake booster 140 and limits air flow to brake booster 140 from intake manifold 144. Brake booster 140 may include a vacuum reservoir 184 (or vacuum cavity) behind a diaphragm 183 of the brake booster for amplifying a force provided by a vehicle operator 130 via a brake pedal 152 for applying vehicle wheel brakes (not shown).

Vacuum reservoir 184 may also receive vacuum from aspirator 30 or intake manifold 144. In particular, a portion of intake air may flow from upstream of intake throttle 20 into intake manifold 144 via conduit 137. While flowing through conduit 137, the air may pass through aspirator 30, generating vacuum at the aspirator's vacuum inlet. A portion of intake air diverted through aspirator 30, and consequently a vacuum generated at aspirator 30, may be controlled by conduit valve 60. Further, a check valve 56 coupled between the aspirator's vacuum inlet and brake booster 140 may prevent backflow of vacuum from the brake booster reservoir 184 towards aspirator 30. A vacuum level at brake booster 140 may be estimated by pressure sensor 146.

Intake manifold 144 is configured to supply intake air or an air-fuel mixture to a plurality of combustion chambers of engine 10. The combustion chambers may be arranged above a lubricant-filled crankcase 114, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor, un-burned air, and exhaust gases may 'blow by' the piston rings and enter the crankcase over time. Additional blow by gases may enter the crankcase via leaking past the intake and exhaust valve seals. To reduce the degrading effects of the fuel vapor on the viscosity of the engine lubricant and to reduce the discharge of the vapor into the atmosphere, the crankcase may be continuously or periodically ventilated, as further described hereinafter. Purging the gases in the crankcase may reduce the humidity in the crankcase. As such, humidity and subsequent water condensation in the crankcase may be a pre-cursor to engine sludge formation. In the configuration shown in FIG. 1, crankcase ventilation valve 28 controls the purging of fuel vapors from the crankcase into the intake manifold along crankcase ventilation line 80.

In one embodiment, crankcase ventilation valve 28 may be a one-way passive valve that provides continual evacuation of crankcase gases from inside the crankcase 114 before connecting to the intake manifold 144. The one-way valve may seal when flow through crankcase ventilation line 80 would tend to flow in the opposite direction. In another embodiment, crankcase ventilation valve 28 may be a valve that varies its flow restriction in response to the pressure drop across it (or flow rate through it). In still other examples, the crankcase ventilation valve may be an electronically controlled valve. Therein, controller 12 may command a signal to change a position of the valve from an open position (or a position of high flow) to a closed position (or a position of low flow), or vice versa, or any position therebetween.

It will be appreciated that, as used herein, crankcase ventilation flow refers to the flow of fuel vapor and gases from the crankcase to the intake manifold along ventilation line 80. Similarly, as used herein, crankcase backflow refers to the flow of fuel vapors and gases along ventilation line 80 from the intake manifold to the crankcase. Backflow may occur when intake manifold pressure is higher than crankcase pressure (e.g., during boosted engine operation). In some embodiments, a check valve 54 may be coupled between intake manifold 144 and crankcase 114, along ventilation line 80, for preventing crankcase backflow. A pressure of fuel vapors in crankcase 114 may be determined by crankcase pressure sensor 62.

Crankcase 114 may include one or more oil separators 96 for separating oil from the crankcase vapors (or "blow by gas") before the vapors are purged to intake manifold 144. Only one oil separator 96 is included because the configuration shown in FIG. 1 enables unidirectional crankcase ventilation, as described below.

When BP>MAP (e.g., during non-boosted conditions), fresh air is drawn into crankcase 114 from air cleaner 33 along vent tube 178. Crankcase fuel vapors and gases are then vented out in a first direction along ventilation line 80, through check valve 54, and into the intake manifold 144 using intake manifold vacuum. Then, when MAP>BP (e.g., during boosted conditions), the crankcase fuel vapors are drawn in the same, first direction along ventilation line 80 using vacuum generated at first aspirator 116. As such, boosted conditions may be present when a pressure at an inlet of throttle 20 (e.g., throttle inlet pressure or TIP) is higher than a pressure at an inlet of compressor 14 (e.g., compressor inlet pressure or CIP). Crankcase fuel vapors may be directed into the inlet of compressor 14 from first aspirator 116 before being delivered to intake manifold 144. Check valve 51 coupled in the vacuum line between the compressor inlet and the crankcase prevents backflow from the compressor to the crankcase. In this way, crankcase gases can be drawn into the intake manifold in the same direction through oil separator 96 during each of boosted and non-boosted conditions, providing for unidirectional crankcase ventilation. Herein, uni-directional crankcase ventilation in this context indicates gases exiting the crankcase 114 via oil separator 96 and not along vent tube 178. As such, this unidirectional flow enables component reduction since only a single oil separator 96 is required at the outlet of the crankcase to remove oil from the blow-by gas. In alternate systems, where bi-directional flow is enabled, the crankcase ventilation tube may conduct flow in both directions. Therein, by nearly always providing a vacuum in ventilation line 80, flow in vent tube 178 may mostly always be from crankcase 114 to air cleaner 33.

It will be appreciated that MAP may be lower than BP even during boosted conditions based on the position of intake throttle 20. Boosted conditions may be measured by a throttle inlet pressure sensor (not shown in FIGS. 1, 2, and 3) positioned downstream of compressor 14 and upstream of intake throttle 20. For example, boosted conditions may include those where MAP>BP and throttle inlet pressure (TIP) is also greater than CIP (TIP>CIP). Non-boosted conditions may include TIP being substantially equal to BP. TIP may also be referred to as boost pressure.

Engine system 100 further includes fuel tank 26, which stores a volatile liquid fuel combusted in engine 10. To avoid emission of fuel vapors from the fuel tank and into the atmosphere, the fuel tank is vented to the atmosphere through adsorbent canister 22. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. In the configuration shown in FIG. 1, canister purge valve 118 controls the purging of fuel vapors from the canister into the intake manifold along purge line 82. Check valve 52 coupled in purge line 82 prevents backflow from intake manifold 144 into canister 22.

When purging conditions are met, such as when the canister is saturated, vapors stored in fuel vapor canister 22 may be purged to intake manifold 144 by opening canister purge valve 118. While a single canister 22 is shown, it will be appreciated that any number of canisters may be coupled in engine system 100. In one example, canister purge valve 118 may be a solenoid valve wherein opening or closing of the valve is performed via actuation of a canister purge solenoid. Canister 22 further includes a vent 117 for routing gases out of the canister 22 to the atmosphere when storing, or trapping, fuel vapors from fuel tank 26. Vent 117 may also allow fresh air to be drawn into fuel vapor canister 22 when purging stored fuel vapors to intake manifold 144 via purge line 82 and purge valve 118. While this example shows vent 117 communicating with fresh, unheated air, various modifications may also be used. Vent 117 may include a canister vent valve 120 to adjust a flow of air and vapors between canister 22 and the atmosphere. Also a vapor blocking valve (not shown) may be positioned between fuel tank 26 and fuel vapor canister 22. Further a fuel tank pressure transducer (not shown) may be coupled in the line between fuel tank 26 and fuel vapor canister 22.

When BP>MAP (e.g., during non-boosted conditions), fuel vapors are drawn from canister 22 in a first direction along purge line 82 into the intake manifold 144, using intake manifold vacuum. Then, when TIP>CIP (e.g., during boosted conditions), the crankcase fuel vapors are drawn in the same, first direction along purge line 82 into the compressor inlet using vacuum generated at first aspirator 116. The fuel vapors are then purged to the intake manifold. Thus, both crankcase gases and fuel vapors can be commonly handled and drawn into the intake manifold together, and in the same direction, during each of boosted and un-boosted conditions. In this way, the embodiment of FIG. 1 uses compressor bypass flow to generate vacuum at a first aspirator during boosted conditions and uses the generated vacuum to purge each of canister fuel vapors and crankcase gases to an engine intake during the boosted conditions. Further, the embodiment uses intake manifold vacuum to purge each of the canister fuel vapors and crankcase gases to the engine intake during non-boosted conditions.

Controller 12 may be configured as a microcomputer including a microprocessor unit, input/output ports, an electronic storage medium for executable programs and calibration values, random access memory, keep alive memory, and a data bus. Controller 12 may receive various signals from sensors 16 coupled to engine 10 such as MAF sensor 58; MAP sensor 162, crankcase ventilation pressure sensor 62; CIP sensor 160, throttle inlet pressure (TIP) sensor (660 shown in FIGS. 6-8); brake booster pressure sensor 146, etc. Furthermore, controller 12 may monitor and adjust the position of various actuators 81 based on input received from the various sensors. These actuators may include, for example, throttle 20, intake and exhaust valve systems, canister purge valve 118, canister vent valve 117, crankcase ventilation valve 28, CBV 106, aspirator control valves 122 and 60, and compressor 14. Storage medium read-only memory in controller 12 can be programmed with computer readable data representing instructions executable by a processor for performing the methods described below, as well as other variants that are anticipated but not specifically listed. Example methods and routines are described herein with reference to FIGS. 5 and 9.

Figure 2:
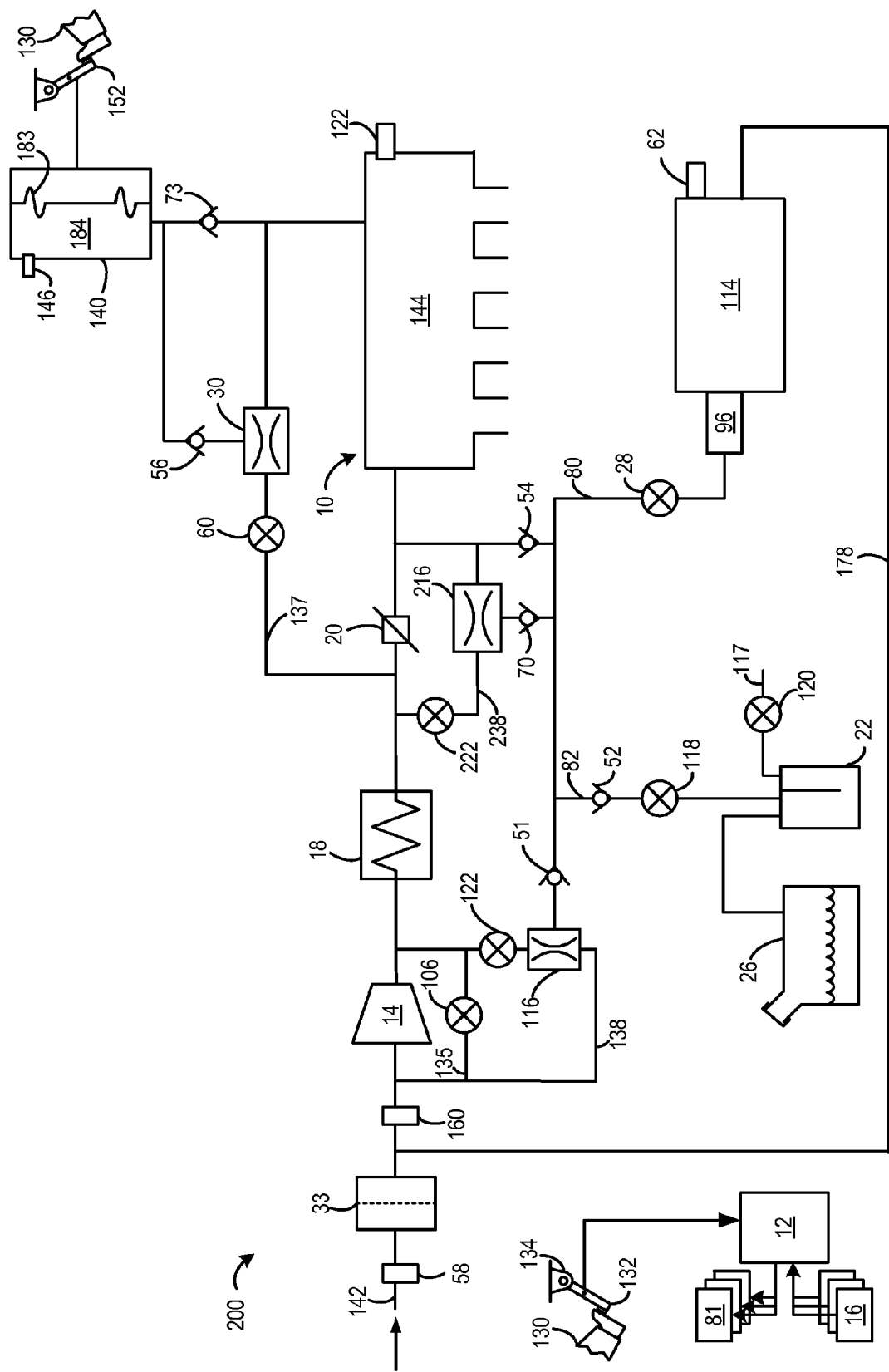

Now turning to FIG. 2, an alternate embodiment 200 of engine system 10 is shown where the intake manifold vacuum is enhanced during non-boosted conditions by an aspirator coupled across an intake throttle. In particular, a second aspirator 216 is positioned in conduit 238 coupled across intake throttle 20, herein also referred to as throttle bypass 238. A throttle bypass valve 222 may be opened to divert a portion of intake air received from air cleaner 33 from upstream of throttle 20, through conduit 238, to intake manifold 144, downstream of throttle 20. Air flowing through throttle bypass 238 may flow from an inlet of second aspirator 216 to an aspirator outlet. Flow through the aspirator may be harnessed into vacuum that is drawn from a vacuum inlet of second aspirator 216. By adjusting an amount of air diverted through throttle bypass 238, an amount of vacuum generated at second aspirator 216 may be varied.

The vacuum generated at second aspirator 216 may be used in conjunction with the intake manifold vacuum during non-boosted conditions to draw fuel vapors from each of the crankcase and the canister into the engine intake manifold 144 for purging. Check valve 70 coupled to the vacuum inlet of second aspirator 216 prevents backflow into the aspirator. By using an aspirator enhanced intake manifold vacuum, a vacuum valley that would otherwise be created when MAP approaches or is at BP can be reduced. As further elaborated with reference to FIG. 4, by reducing the manifold vacuum valley, a purging efficiency is improved and a vacuum pump requirement (for meeting the vacuum need in the vacuum valley) is significantly reduced.

Figure 3:
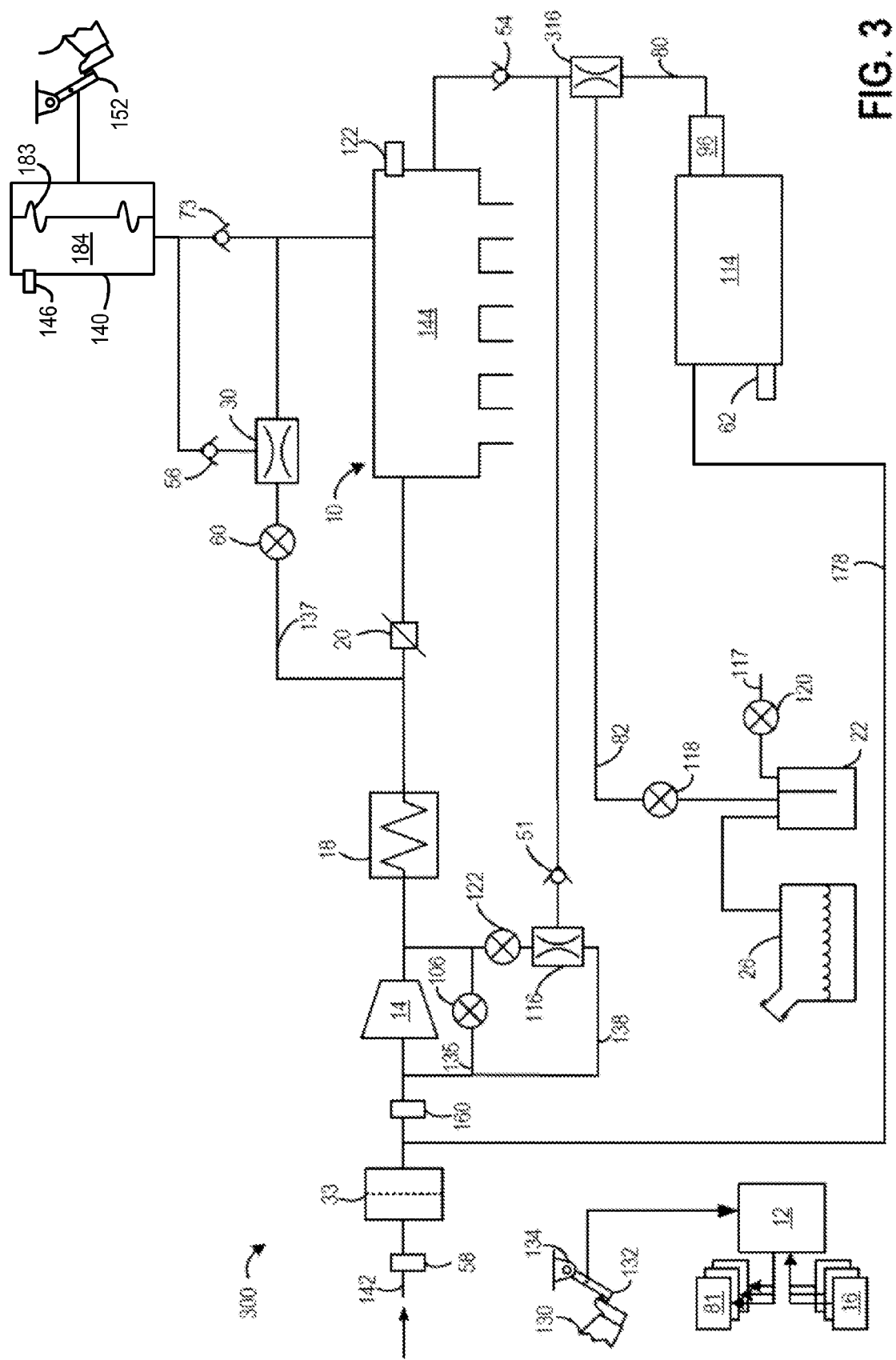

A further embodiment 300 of engine system 10 is shown with reference to FIG. 3 wherein the engine system includes a third aspirator for enhancing the intake manifold vacuum. In particular, a third aspirator 316 is coupled in crankcase ventilation line 80 between an outlet of the crankcase 114 and intake manifold 144. During non-boosted conditions, intake air is drawn from downstream of air cleaner 33 into crankcase 114 along vent tube 178 and from there the crankcase gases are vented to a compressor inlet along ventilation line 80. The crankcase flow is harnessed by positioning third aspirator 316 in ventilation line 80 so that all crankcase flow is directed through third aspirator 316. In one embodiment, third aspirator 316 may be similar to a sonic choke wherein the need for a dedicated ventilation valve (such as valve 28 of FIGS. 1-2) is reduced. In the depicted embodiment where the third aspirator has the properties of a sonic choke, with a pressure drop of approximately 10 kPa, the sonic choke may result in a constant flow rate at all pressure drops in excess of 10 kPa, for example.

During non-boosted conditions, the vacuum generated at third aspirator 316 is then used, in addition to the vacuum generated at first aspirator 116, to draw each of the crankcase and canister fuel vapors into the engine intake manifold. By enhancing the vacuum generated by the intake manifold vacuum with vacuum generated by harnessing crankcase flow, a vacuum required for purging fuel vapors can be met, in particular during conditions when a manifold vacuum valley may otherwise occur, without needing a dedicated vacuum pump. During boosted conditions, a compressor bypass flow may be harnessed at first aspirator 116 and used to draw each of purge fuel vapors from the canister and crankcase gases from the crankcase along purge line 82 and ventilation line 80 into an inlet of compressor 14. It will be appreciated that fuel vapors from both the canister and the crankcase are drawn into the intake manifold in a common direction during non-boosted operation. Likewise, fuel vapors from both the canister and the crankcase are drawn into the compressor inlet in a common direction during boosted operation. As such the configuration enables crankcase gases to flow out of the crankcase in a common direction during both boosted and non-boosted conditions, thereby allowing use of a single oil separator 96 at the outlet of the crankcase. In comparison, multiple oil separators would have been required at each end of the crankcase if bi-directional flow were configured. Thus, the configuration not only allows for common handling of canister fuel vapors and crankcase gases, but also provides component reduction benefits.

While FIG. 2 shows enhancing a purge vacuum provided by the intake manifold with vacuum generated using throttle bypass flow and FIG. 3 shows enhancing a purge vacuum provided by the intake manifold with vacuum generated using crankcase flow, in still further embodiments, engine system may be configured to include each of second aspirator 216 (of FIG. 2) and third aspirator 316 (of FIG. 3) so that the purge vacuum can be enhanced with each of throttle bypass flow and crankcase flow.

It will be appreciated that the engine embodiments of FIGS. 1 and 2 depict the first aspirator 116 drawing fuel vapors from crankcase 114 through crankcase ventilation valve 28. In the embodiment of FIG. 3, fuel vapors from the crankcase flow through third aspirator 316 before flowing into first aspirator 116. Thus, either the crankcase ventilation valve 28 or the third aspirator 316 (or a sonic choke as third aspirator) may constrain a flow rate of fuel vapors exiting crankcase 114 from oil separator 96. Further still, either the crankcase ventilation valve 28 or the third aspirator 316 (or a sonic choke as third aspirator) may reduce (e.g., limit) the flow rate of fuel vapors from crankcase 114 into each of first aspirator 116 and second aspirator 216.

In this way, the system of FIGS. 1-3 enable vacuum to be drawn at a first aspirator using compressor bypass flow during boosted conditions while enabling intake manifold vacuum to be enhanced by drawing vacuum at a second aspirator using intake throttle bypass flow and/or at a third aspirator using crankcase flow, during non-boosted conditions. Then, during both the boosted and non-boosted conditions, the drawn vacuum can be applied to purge fuel vapors from each of a canister and a crankcase to the intake manifold. By merging the fuel vapors from the canister into a common purge line, purging of the canister can be better coordinated with venting of the crankcase. By drawing vapors from the canister and vapors from the crankcase in a common direction through an oil separator (that is, unidirectional flow), during both boosted and non-boosted conditions, component reduction benefits can be achieved, such as by lowering the requirement for multiple oil separators.

Figure 4:
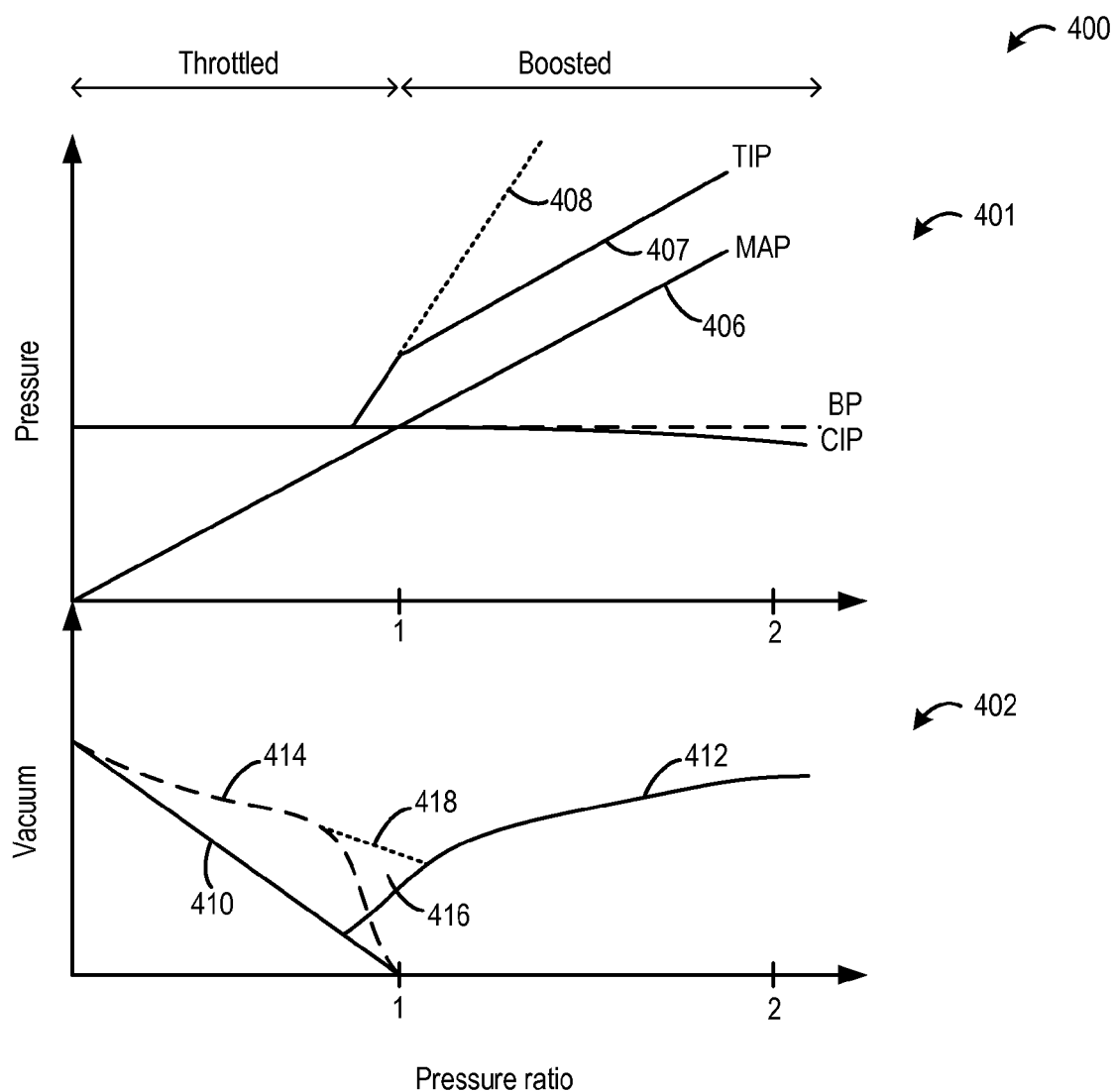
FIG. 4 shows a map illustrating an example change in manifold vacuum valley upon use of the multiple aspirators of FIGS. 1-3.

An example of how the embodiment of FIGS. 2-3 enables an intake manifold vacuum to be enhanced is show with reference to FIG. 4. Specifically, map 400 includes an upper plot 401 depicting pressure along the y-axis and a pressure ratio along the x-axis. The lower plot 402 depicts vacuum along the y-axis and a pressure ratio along the x-axis. Upper plot 408 depicts throttle inlet pressure (TIP) if a boosting device wastegate were closed at plot 408, and throttle inlet pressure if the boosting device wastegate were controlled to keep TIP at a constant level above MAP at plot 407.

When manifold pressure MAP (plot 406) is below barometric pressure BP (dashed line), the engine may be operating throttled (or non-boosted). During such conditions, a purge vacuum for canister purging and crankcase ventilation may be provided by the intake manifold vacuum (plot 410) or by an aspirator that sources air at BP (or TIP) and exhausts air at MAP, such as second aspirator 216 of FIG. 2 (plot 414). When using MAP alone for providing vacuum (plot 410), the available purge vacuum goes to zero when MAP is at barometric pressure. When manifold pressure MAP (plot 406) is above barometric pressure BP (dashed line), the engine may be operating boosted. During such conditions, a purge vacuum for canister purging and crankcase ventilation may be provided by first aspirator 116 (FIG. 1) coupled to the compressor bypass (plot 412). In particular, first aspirator 116 that runs on boost air sources air at throttle inlet pressure (TIP, 407) and exhausts at compressor inlet pressure (CIP). Consequently, it may begin to contribute vacuum as soon as TIP gets above CIP. Further, the motive flow results from the difference between plot 407 and CIP on graph 401, and produces vacuum curve 412. In other words, plot 414 shows the vacuum enhancement resulting from use of an aspirator that runs from BP to MAP, while plot 412 shows vacuum enhancement resulting from use of an aspirator that runs from TIP to CIP.

A second aspirator coupled to the throttle bypass may also be used during non-boosted conditions to provide a purge vacuum. As such, by itself, the second aspirator may provide vacuum that follow a profile shown at plot 414. As MAP approaches BP, the intake manifold vacuum drops, until there is insufficient vacuum for purging when MAP=BP (when pressure ratio is 1). In addition, during such conditions, neither the first aspirator nor the second aspirator has sufficient vacuum for enabling purge. As a result, a vacuum valley 416 is created when MAP is at BP. This drop in purge vacuum availability when MAP is at BP leads to a corresponding drop in purging efficiency, degrading emissions.

The second aspirator (such as aspirator 216 of FIG. 2) placed between TIP and MAP is powered from the pressure difference (shown on graph 401) of TIP 407 and MAP 406. By using this pressure difference which is maintained as constant (in steady state), a vacuum may be provided that bridges the valley (418). In particular, vacuum valley 418 may result from TIP minus MAP. Since the second aspirator relying on the TIP minus MAP pressure difference has a greater pressure difference than the first aspirator relying on the TIP minus CIP pressure difference, it may be able to better bridge vacuum valley 418. That is, plot 418 shows the vacuum enhancement resulting from use of an aspirator that runs from TIP to MAP.

By using the second aspirator in conjunction with the intake manifold vacuum, the intake vacuum can be enhanced, as shown by dotted line 418, allowing sufficient purge vacuum to be available even during those conditions.

Figure 5:
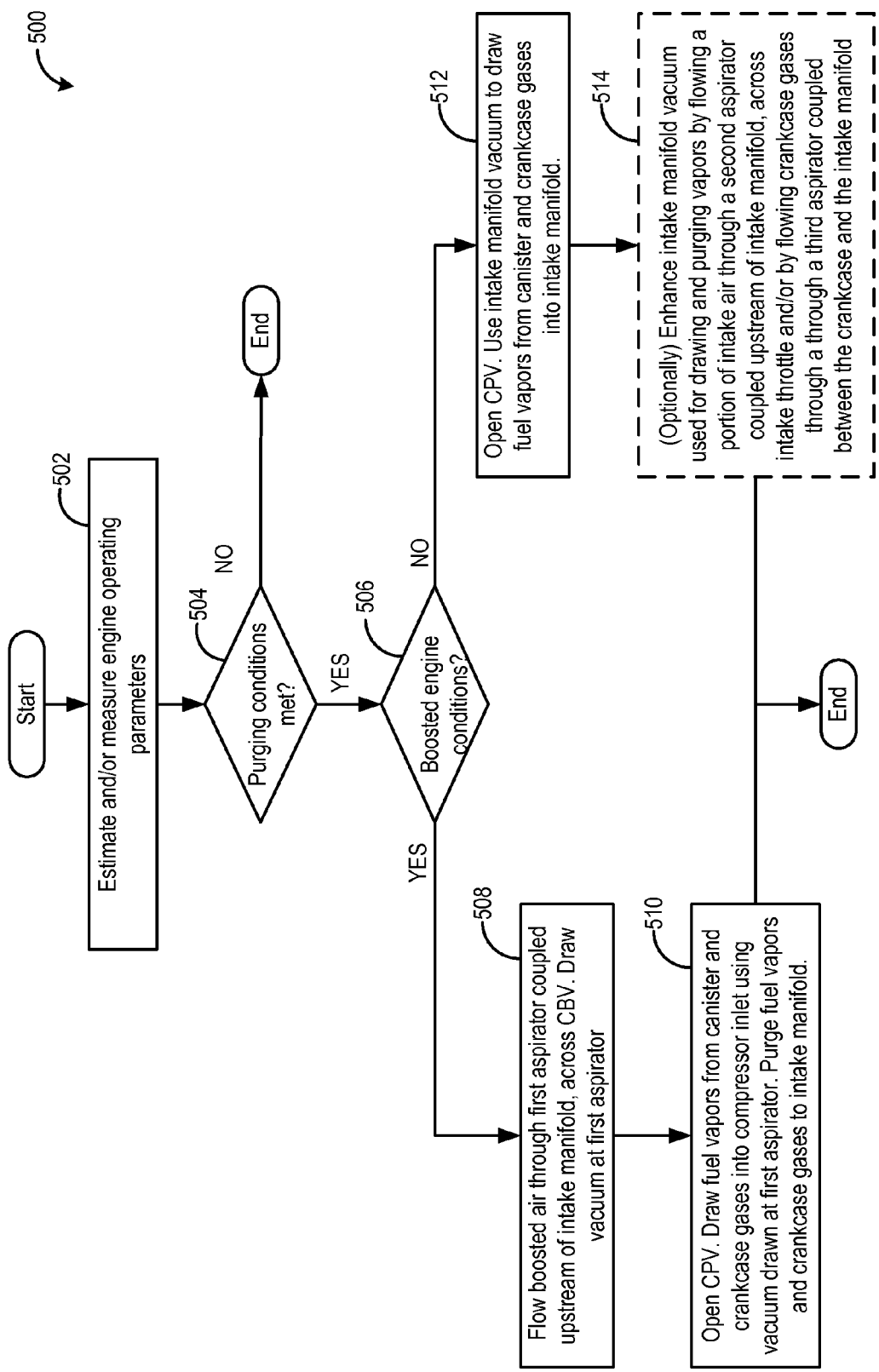
FIG. 5 illustrates a method for generating vacuum at the multiple aspirators of FIGS. 1-5 during boosted and non-boosted engine operating conditions to enable common handling of fuel vapor purge and crankcase ventilation.

Now turning to FIG. 5, an example method 500 is shown for operating an engine system with a plurality of aspirators to enhance a vacuum used for purging fuel vapors from a canister and a crankcase together to an intake manifold. By using vacuum from the aspirators, a purge vacuum requirement can be met without incurring fuel economy penalties.

At 502, the method includes estimating and/or measuring engine operating parameters. These may include, for example, an engine speed, engine temperature, catalyst temperature, MAP, MAF, BP, canister load, vacuum level in a vacuum reservoir coupled to a vacuum consumption device, etc. At 504, it may be determined if canister purging conditions have been met. In one example, canister purging conditions may be considered met if a canister hydrocarbon load (as determined or inferred) is higher than a threshold load. In another example, purging conditions may be considered met if a threshold duration or distance of travel has elapsed since a last canister purging operation.

If purging conditions are confirmed, the routine moves to 506 to determine if boosted engine conditions are present. For example, MAP may be compared to BP to determine if boosted conditions are present. If boosted conditions are present, the routine proceeds to perform a purging operation under boosted conditions at 508-510, as elaborated below. Else, if boosted conditions are not present, then the routine proceeds to perform a purging operating under non-boosted conditions at 512-514, as elaborated below.

If boosted conditions are confirmed, at 508, the routine includes flowing a portion of intake air compressed by a compressor through a first aspirator coupled across the compressor bypass, upstream of the engine intake manifold. In particular, a compressor bypass flow may be directed through the first aspirator and harnessed to generate vacuum. The first aspirator may be positioned in a conduit coupled across a compress bypass. Drawing vacuum at the first aspirator using compressor bypass flow may include opening a first valve to divert a portion of compressed intake air from downstream of the compressor, through the conduit and through the first aspirator, to upstream of the compressor. An amount of vacuum drawn at the first aspirator may be varied by a controller by adjusting a compressor bypass valve opening. In particular, the amount of vacuum drawn at the first aspirator may be increased as the compressor bypass valve opening is increased to divert a larger portion of compressed intake air through the first aspirator.

At 510, the vacuum drawn at the first aspirator using compressor bypass flow may be applied on a fuel system canister and a crankcase so that fuel vapors are purged from both the canister and the crankcase into an inlet of the compressor, for subsequent purging in the intake manifold. As such, during the boosted conditions, the fuel vapors from the canister and the crankcase gases are routed to the intake manifold via the compressor inlet. Purging fuel vapors from the canister includes opening a purge valve coupled between the canister and the intake manifold to draw fuel vapors from the canister along a purge line into the compressor inlet using the vacuum drawn at the first aspirator. At the same time, a ventilation valve may open so that crankcase gases can be drawn into the compressor inlet, along a ventilation line, into the compressor inlet using the vacuum drawn at the first aspirator. As shown at FIGS. 1-3, the purge line and ventilation line may merge so that fuel vapors from both the canister and the crankcase are merged into a common vacuum line and drawn into the compressor inlet along a first, common direction during the boosted conditions. This enables common handling of both vapors. Fuel vapors ingested at the compressor inlet may then be delivered to the intake manifold for subsequent combustion. Both vapors may be ingested substantially at atmospheric pressure. An opening of the purge valve may be based on a combustion air-to-fuel ratio desired at the engine and a position of the crankcase ventilation valve coupled between the crankcase and the intake manifold.

Returning to 506, if boosted engine conditions are not confirmed, then at 512, the routine includes applying an intake manifold vacuum on the canister and the crankcase to draw in fuel vapors for purging. As such, during the non-boosted conditions, the fuel vapors from the canister and the crankcase are routed to the intake manifold directly. Purging fuel vapors from the canister includes opening the purge valve coupled between the canister and the intake manifold to draw fuel vapors from the canister along the purge line into the intake manifold using intake manifold vacuum generated by the spinning engine. At the same time, a ventilation valve may open so that crankcase gases can be drawn into the intake manifold, along the ventilation line, into the intake manifold. As shown at FIGS. 1-3, the purge line and ventilation line may merge so that fuel vapors from both the canister and the crankcase are merged into a common vacuum line and drawn into the intake manifold along the first, common direction during the non-boosted conditions. This enables common handling of both vapors. An opening of the purge valve may be based on a combustion air-to-fuel ratio desired at the engine and a position of the crankcase ventilation valve coupled between the crankcase and the intake manifold. For example, the purge valve opening may be based on whether the ventilation valve is in a high flow or low flow position.

Optionally, at 514, an intake manifold vacuum may be enhanced. As elaborated above, during the boosted conditions, the first aspirator in the compressor bypass provides the vacuum required for both fuel vapor purge and crankcase ventilation. Then, during non-boosted conditions, manifold vacuum is used to provide the vacuum required for both the fuel vapor purge and crankcase ventilation. However, during conditions when MAP is substantially at barometric pressure (BP), there may be insufficient manifold vacuum as well as not enough vacuum at the first aspirator. This leads to a vacuum valley. The lower vacuum availability during these conditions can reduce purging efficiency. As such, if the canister is not sufficiently purged and the crankcase is not properly ventilated, exhaust emissions may be degraded.

The intake manifold vacuum may be selectively enhanced by drawing vacuum at a second aspirator using intake throttle bypass flow. The second aspirator may be positioned in a conduit (or throttle bypass) coupled across an intake throttle. Drawing vacuum at the second aspirator using throttle bypass flow may include opening a second valve to divert a portion of intake air from upstream of the throttle, through the conduit and the second aspirator, to downstream of the throttle. An amount of vacuum drawn at the second aspirator may be varied by a controller by adjusting a throttle bypass valve opening, the amount of vacuum drawn at the second aspirator increased as the throttle bypass valve opening is increased. Additionally, or alternatively, the intake manifold vacuum may be enhanced by flowing fuel vapors from the crankcase to the intake manifold via a third aspirator. The vacuum drawn at the third aspirator may then be applied on the canister to purge fuel vapors from the canister to the intake manifold. In this way, crankcase flow can be harnessed for enhancing intake manifold vacuum.

In one example, when operating an engine boosted, a controller may draw fuel vapors in a first direction from each of a fuel system canister and a crankcase into an engine intake manifold using vacuum drawn at a first aspirator coupled to a compressor. In particular, a portion of compressed air may be diverted from downstream of a compressor to upstream of the compressor via a first conduit (or compressor bypass) coupled across the compressor. The diverted portion of compressed air may be flowed through the first aspirator coupled in the first conduit, and vacuum may be drawn from the first aspirator. This vacuum generated at the first aspirator using the compressor bypass flow is then used as a purge vacuum during boosted conditions. Fuel vapors may be routed to the intake manifold via the compressor inlet. Herein, a flow rate of compressed air flow diverted through the first aspirator is independent of a position of the intake throttle. The portion of compressed air diverted through the first aspirator in the first conduit may be varied by adjusting a first valve coupled in the first conduit, upstream of the first aspirator. In this way, the purge vacuum generated can be varied.

In comparison, when operating the engine non-boosted, the controller may draw fuel vapors from each of the canister and the crankcase in the first direction into the intake manifold using intake manifold vacuum. Fuel vapors may be routed to the intake manifold directly. Further, the intake manifold vacuum may be selectively enhanced using vacuum drawn at a second aspirator coupled to an intake throttle. In particular, a portion of intake air may be diverted from upstream of an intake throttle to downstream of the throttle via a second conduit (or throttle bypass) coupled across the throttle. The diverted portion of intake air may be flowed through the second aspirator coupled in the second conduit, and vacuum may be drawn from the second aspirator. The portion of intake air diverted through the second aspirator in the second conduit may be varied by adjusting a second valve coupled in the second conduit, upstream of the second aspirator. Herein, a flow rate of intake air diverted through the second aspirator may be based on the position of the intake throttle.

Additionally, or optionally, the intake manifold vacuum may be selectively enhanced using vacuum drawn at a third aspirator coupled to the crankcase. In particular, crankcase gases and fuel vapors may be drawn into the intake manifold using the intake manifold vacuum along a ventilation line and via the third aspirator. The crankcase gases may be routed to the intake manifold through the third aspirator, and vacuum may be drawn from the third aspirator. Fuel vapors may then be drawn in the first direction from the canister and the crankcase into the intake manifold using the enhanced intake manifold vacuum. Herein, selectively enhancing the intake manifold vacuum includes enhancing the intake manifold vacuum when intake manifold pressure is a threshold distance from barometric pressure.

Figure 6:
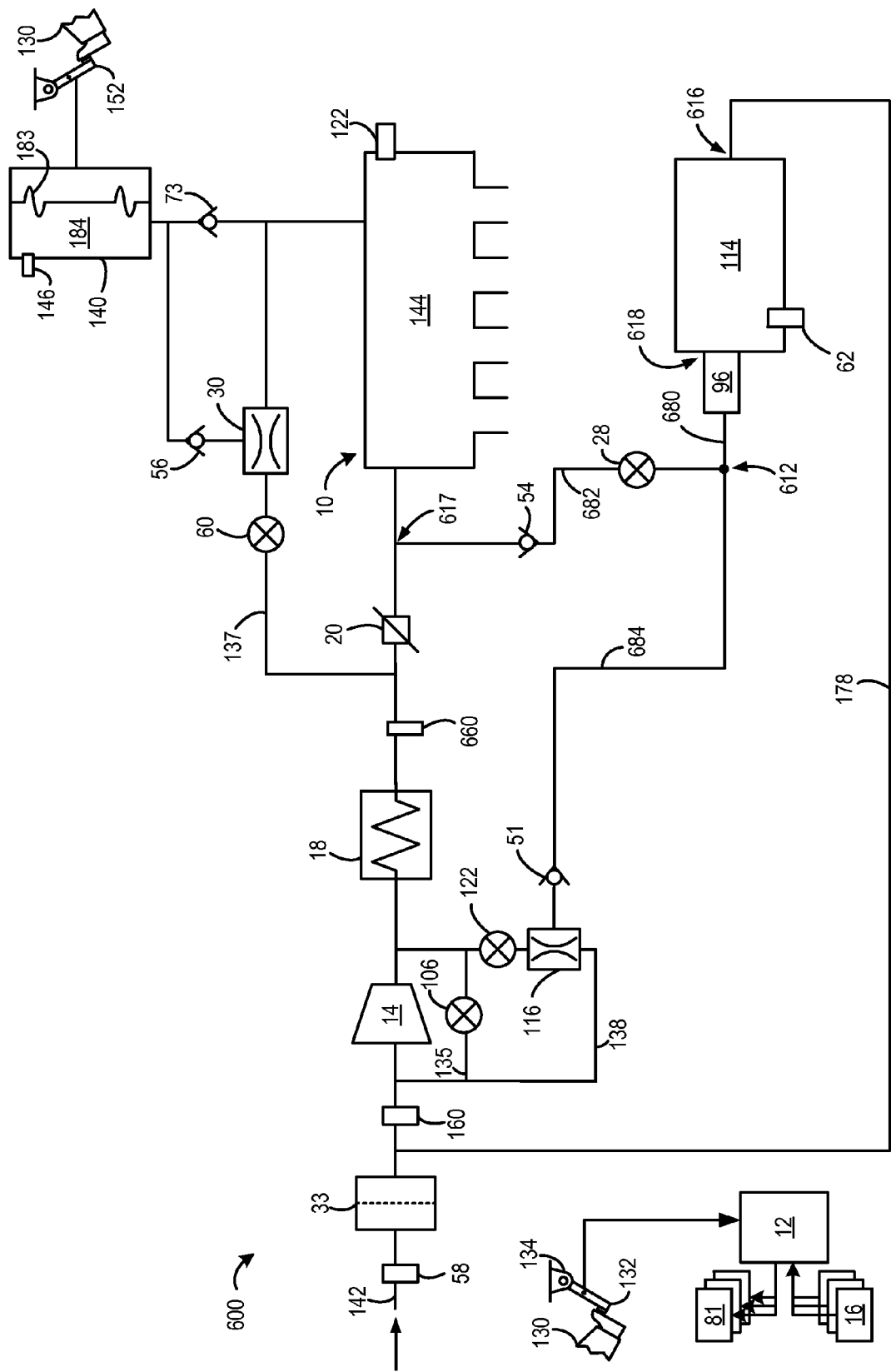
FIGS. 6, 7 and 8 show additional example embodiments of an engine system capable of enhancing crankcase ventilation.

Turning now to FIG. 6, an alternate embodiment 600 of example engine system 100 of FIG. 1 is shown where the first aspirator 116 draws fuel vapors from crankcase 114 via oil separator 96, the fuel vapors bypassing crankcase ventilation valve 28. Since the crankcase ventilation valve 28 is not in the flow path of the fuel vapors exiting the crankcase towards first aspirator 116, crankcase ventilation valve 28 may not constrain (e.g., limit) the flow rate of fuel vapors from crankcase 114 into first aspirator 116. It will be noted that the canister 22 and associated piping are not depicted in FIG. 6 (or FIGS. 7 and 8) for the sake of simplicity. Further, multiple components depicted in embodiment 600 of FIG. 6 may be similar to those introduced in FIG. 1. Accordingly, these components are numbered the same and are not re-introduced.

Similar to engine system 100 of FIG. 1, first aspirator control valve 122 positioned in series with first aspirator 116 may regulate a flow rate of compressed air flowing through first aspirator 116. Air flowing through first aspirator 116 via first conduit 138 may enable generation of vacuum at first aspirator 116. Thus, first aspirator control valve 122 may control vacuum generation at first aspirator 116 by regulating the flow of air through first conduit 138. As such, first aspirator control valve 122 may be maintained open constantly through engine operation except when turbocharger spool-up is desired, e.g. during high acceleration conditions. In one example, first aspirator control valve 122 is closed only when a vehicle operator initially applies an accelerator pedal. In this way, during boosted conditions, vacuum is drawn at the first aspirator using compressor bypass flow. In some embodiments, first aspirator control valve 122 may not be included. Herein, air flow through first conduit 138 may occur every time there is a pressure difference in the intake passage 142 between post-compressor region (e.g., part of intake passage downstream of compressor 14) and inlet of compressor 14 (e.g., part of intake passage 142 upstream of compressor 14).

The first aspirator 116 may be fluidly coupled with oil separator 96 of crankcase 114 via first ventilation conduit 680 and second ventilation conduit 684. Check valve 51 coupled to a vacuum inlet of first aspirator 116 may block backflow from first aspirator 116 to crankcase 114 along second ventilation conduit 684. Check valve 51 may be optional. As shown, first ventilation conduit 680 and second ventilation conduit 684 meet at node 612. Third ventilation conduit 682 is also depicted merging with first ventilation conduit 680 and second ventilation conduit 684 at node 612. In other words, first ventilation conduit 680 exiting out of crankcase 114 via oil separator 96 may split into second ventilation conduit 684 and third ventilation conduit 682 at node 612. Put another way, third ventilation conduit 682 and second ventilation conduit 684 merge into first ventilation conduit 680 at node 612.

Crankcase ventilation valve 28 is positioned in third ventilation conduit 682 downstream of node 612 and therefore, may regulate flow of fuel vapors along third ventilation conduit 682 alone. Thus, crankcase ventilation valve 28 may not regulate flow of fuel vapors from crankcase 114 through second ventilation conduit 683. Specifically, the flow of fuel vapors from crankcase 114 into first aspirator 116 may not be controlled by crankcase ventilation valve 28. Thus, when first aspirator control valve 122 enables compressed air flow through first aspirator 116 and a vacuum is generated at first aspirator 116, fuel vapors from crankcase 114 may be drawn into first aspirator 116 via oil separator 96, through first ventilation conduit 680, past node 612, and through second ventilation conduit 684 across check valve 51. Specifically, fresh air may flow from downstream of air cleaner 33 and upstream of compressor 14 into vent tube 178 and then into crankcase 114 at inlet port 616 of crankcase 114. This fresh air may then exit the crankcase 114 along with fuel vapors in crankcase 114 through oil separator 96 at outlet port 618, and into first ventilation conduit 680. During boosted conditions when MAP>BP, such as when MAP is substantially equal to throttle inlet pressure (TIP) as measured by TIP sensor 660, fuel vapors from crankcase 114 may flow into first aspirator 116 while bypassing crankcase ventilation valve 28, as described earlier. As such, in that particular condition, the crankcase 114 may be evacuated of fuel vapors without being controlled by the crankcase ventilation valve 28. Further, fuel vapors from the crankcase may not flow into third ventilation conduit 682 when MAP is greater than BP. Further still, check valve 54 may block the flow of air from intake manifold 144 into crankcase 114.

TIP sensor 660, as shown in FIG. 6, may be positioned along intake passage 142 downstream of compressor 14 and upstream of intake throttle 20. TIP sensor 660 may provide an estimate of boost pressure.

During cruising conditions, the engine may be operating with lower boost levels (as measured by TIP sensor 660). Further, when the engine is operating with reduced boost, the intake throttle 20 may be partly closed allowing MAP to be lower than BP. Thus, during conditions when TIP is greater than BP, MAP may be lower than BP based on the position of the intake throttle. As such, shallow vacuum (e.g., 10 kPa gauge pressure) conditions may exist in the intake manifold 144. Shallow intake manifold vacuum conditions may include MAP being lower than BP within a threshold, e.g., BP−MAP≤Threshold. In other words, shallow vacuum in the intake manifold may exist when MAP is lower than BP by a threshold limit. The threshold, in one example, may be 15 kPa gauge. Herein, intake manifold vacuum may be a vacuum level that is between 0 and 15 kPa. In another example, the threshold may be 20 kPa gauge. Herein, intake manifold vacuum level may be between 0 and 20 kPa. Thus, intake manifold vacuum that is higher than the threshold may not be considered shallow vacuum. It will be noted that vacuum may also be referred to as negative pressure.

When a shallow vacuum is produced in intake manifold 144 downstream of intake throttle 20, the crankcase ventilation valve 28 may be opened to allow additional fuel vapors to flow into intake manifold 144 via third ventilation conduit 682 and through check valve 54 coupled in third ventilation conduit 682. For example, in the case of the crankcase ventilation valve being a valve that varies its flow restriction in response to the pressure drop across it, the shallow vacuum in intake manifold 144 may produce a larger opening in crankcase ventilation valve 28.

In one example configuration, the crankcase ventilation valve 28 may include a substantially conic member (also termed, cone) arranged within a valve housing, where the cone is oriented within the valve housing such that its tapered end faces an end of the valve housing which communicates with the intake manifold. When there is no vacuum in the intake manifold, for example during engine off conditions, a spring keeps the base of the cone seated against the end of the valve housing which communicates with the crankcase, such that the crankcase ventilation (CV) valve is fully closed.

When there is a high level of vacuum (e.g., vacuum deeper than 50 kPa) in the intake manifold, for example under engine idle or deceleration conditions, the cone moves within the valve housing towards the intake manifold end of the valve housing due to the significant increase in intake manifold vacuum. At this time, the crankcase ventilation valve is substantially closed, and crankcase vapors move through a small annular opening between the cone and the valve housing. Since a smaller amount of blow-by gases may be produced during engine idle or deceleration conditions, the smaller annular opening may be adequate for crankcase ventilation.

When intake manifold vacuum is lower (e.g., 15 to 50 kPa) such as during part-throttle operation, the cone moves closer to the crankcase end of the valve housing, and crankcase ventilation flow moves through a larger annular opening between the cone and the valve housing. At this time, the crankcase ventilation valve may be partially open. During part-throttle operation, there may be an increased amount of blow-by gases in the crankcase relative to engine idle or deceleration conditions, and thus the larger annular opening may be appropriate for crankcase ventilation.

Finally, a further decrease in intake manifold vacuum to shallower vacuum levels, such as during cruising conditions (e.g., 0 to 15 kPa), moves the cone considerably closer to the crankcase end of the valve housing, and crankcase ventilation flow moves through an even larger annular opening between the cone and the valve housing. At this time, the crankcase ventilation valve (e.g., crankcase ventilation valve 28) may be fully open, such that crankcase ventilation flow through the crankcase ventilation valve is higher (e.g., at a maximum). Thus, in this example configuration of the crankcase ventilation valve, as the pressure drop across the crankcase ventilation valve decreases, an opening of the crankcase ventilation valve may increase.

By increasing an opening of the crankcase ventilation valve 28, additional fuel vapor flow may be allowed therethrough from crankcase 114. These additional fuel vapors flowing through crankcase ventilation valve 28 via third ventilation conduit 682 may enter intake manifold 144 directly (e.g., without flowing through first aspirator 116, or without entering the inlet of compressor 14) at a location 617 that is downstream of intake throttle 20.

It will be noted that additional fuel vapors from crankcase 114 flowing directly into intake manifold 144 downstream of intake throttle 20 via third ventilation conduit 682 may flow at the same time that fuel vapors from crankcase 114 flow through first aspirator 116 to the inlet of compressor 14 via first conduit 138. To elaborate, during cruising conditions when the engine is operating with lower boost levels but with shallow vacuum levels in the intake manifold, fuel vapors from crankcase 114 may be evacuated concurrently via two paths: via first aspirator 116 to inlet of compressor 14 through first conduit 138 and via crankcase ventilation valve 28 directly into intake manifold 144 through third ventilation conduit 682. To further elaborate, during cruising conditions, fresh air entering crankcase 114 via vent tube 178 at inlet port 616 may exit crankcase 114 at outlet port 618 via oil separator 96 along with fuel vapors in crankcase 114. At node 612, a first portion of fuel vapors may flow into second ventilation conduit 684 towards first aspirator 116 while a second portion (e.g., remaining portion) of fresh air and fuel vapors exiting crankcase 114 may flow into third ventilation conduit 682, through crankcase ventilation valve 28 and enter the intake manifold 144 directly. Alternative embodiments may include crankcase ventilation valve 28 28 located in first ventilation conduit 680 instead of in third ventilation conduit 682.

In this way, during boosted engine conditions (e.g. when TIP>CIP) and when a shallow vacuum is present in the intake manifold (e.g., 0-15 kPa), additional fuel vapors from the crankcase may flow along a low restriction path towards the intake manifold. Further still, at the same time, fuel vapors from the crankcase may also flow to the first aspirator allowing a faster reduction in fuel vapors from the crankcase.

Figure 7:
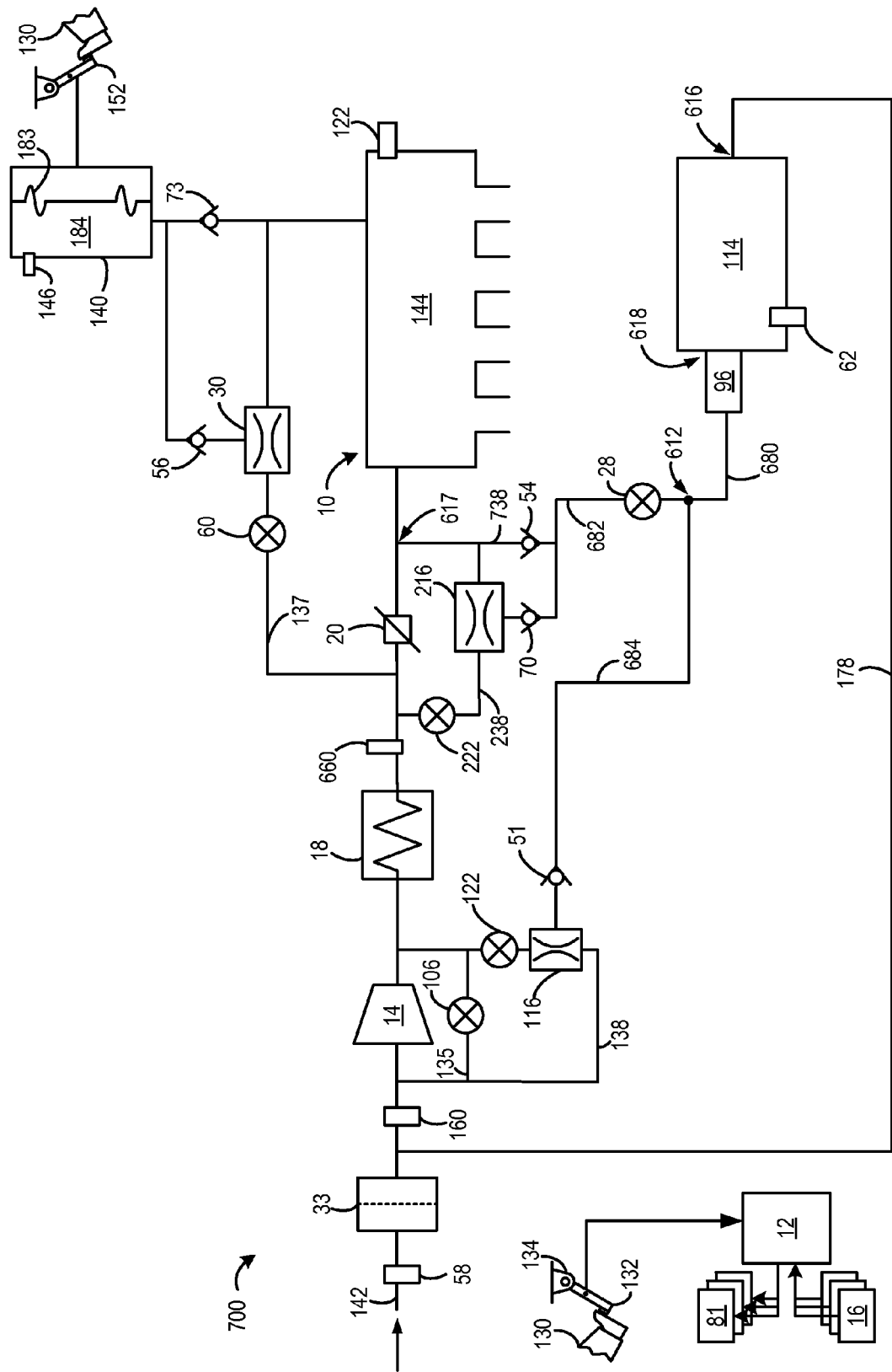

Turning now to FIG. 7, it shows an alternative embodiment 700 similar to the embodiments of FIG. 2 and FIG. 6. As in FIG. 2, embodiment 700 of FIG. 7 includes second aspirator 216 coupled across intake throttle 20 within throttle bypass 238. As in FIG. 2, throttle bypass valve 222 may be opened to divert a portion of intake air received from compressor 14 from upstream of intake throttle 20, through conduit 238, to intake manifold 144, downstream of intake throttle 20. Air flowing through throttle bypass 238 may flow from an inlet of second aspirator 216 to an outlet of second aspirator 216. Flow through second aspirator 216 may be harnessed into vacuum that is drawn from a vacuum inlet of second aspirator 216. This vacuum may be applied to crankcase ventilation valve 28 to draw fuel vapors from crankcase 114.

FIG. 7 includes multiple components introduced in embodiment 600 of FIG. 6 and embodiment 200 of FIG. 2. Accordingly, these components are numbered the same and are not re-introduced.

The vacuum generated at second aspirator 216 may be used in conjunction with the intake manifold vacuum during conditions when MAP is lower than BP (e.g., non-boosted conditions and boosted conditions when MAP is lower than BP) to draw fuel vapors from the crankcase into the intake manifold 144. Check valve 70 coupled to the vacuum inlet of second aspirator 216 prevents backflow from second aspirator 216 to crankcase 114. Aspirator vacuum may enhance intake manifold vacuum, particularly when shallow manifold vacuum levels exist in the intake manifold. As in FIG. 2, fuel vapors flowing through crankcase ventilation valve 28 from crankcase 114 may enter intake manifold 144 downstream of intake throttle 20 via one of two paths: via second aspirator 216 along throttle bypass 238, and via check valve 54 through conduit 738.

Similar to FIG. 6, first aspirator 116 is fluidly coupled to crankcase 114 via second ventilation conduit 684 and first ventilation conduit 680. Further still, fuel vapors may flow from crankcase 114 to first aspirator 116 without flowing through crankcase ventilation valve 28.

In the embodiment 700 of FIG. 7, fuel vapor flow from crankcase 114 during boosted conditions with MAP>BP and during non-boosted conditions (e.g., when TIP=BP) may be the same as those described earlier in reference to FIGS. 1 and 2. However, during conditions when TIP is higher than BP but MAP is lower than BP, e.g., lower levels of boost with shallow intake manifold vacuum levels, fuel vapor purge from crankcase 114 may occur along three paths: via first aspirator 116, via second aspirator 216, and via conduit 738. Thus, during shallow intake manifold vacuum levels, the second aspirator 216 may enhance intake manifold vacuum levels by generating vacuum from throttle bypass flow along throttle bypass 238. Thus, both intake manifold vacuum and vacuum from second aspirator 216 may draw fuel vapors from crankcase 114 through crankcase ventilation valve 28 into intake manifold 144. As such, the crankcase ventilation valve 28 may be open during shallow vacuum in the intake manifold, as explained earlier, enabling fuel vapor flow therethrough.

To elaborate, during conditions when the engine is operating boosted with shallow intake manifold vacuum, fuel vapors flowing from crankcase 114 exit out of outlet port 618 through oil separator 96 into first ventilation conduit 680, and at node 612, a first portion of fuel vapors flows into second ventilation conduit 684 and into first aspirator 116, and thereon into the inlet of compressor 14 (or upstream of compressor 14). Simultaneously, remaining portion of fuel vapors (e.g., fuel vapors that do not flow into second ventilation conduit 684) may flow from node 612 into third ventilation conduit 682 and through crankcase ventilation valve 28. A second portion of this remaining portion of fuel vapors may flow into second aspirator 216 via check valve 70 and thereon into intake manifold 144 downstream of intake throttle 20 while a third portion of this remaining portion of fuel vapors may flow directly into intake manifold 144 via conduit 738 to location 617. In other words, fuel vapors exiting the crankcase may be directed to each of the first aspirator 116, the second aspirator 216, and directly into the intake manifold via conduit 738 at the same time.

Throttle bypass valve 222 may be optional and when throttle bypass valve 222 is not present, air flow in throttle bypass 238 occurs due to a difference in throttle inlet pressure and intake manifold pressure (e.g., MAP).

An example system may, thus, comprise, an engine including an intake manifold, a compressor positioned in an intake passage for providing a boosted aircharge, a compressor bypass passage coupled around the compressor, the compressor bypass passage including a compressor bypass valve, a first aspirator coupled to the compressor bypass passage, a throttle coupled in the intake passage, a throttle bypass passage coupled around the throttle, the throttle bypass passage including a throttle bypass valve, a second aspirator coupled to the throttle bypass passage, a crankcase, an outlet port of the crankcase coupled fluidly to each of the first aspirator, the second aspirator, and the intake manifold, a crankcase ventilation (CV) valve regulating flow between the outlet port of the crankcase and each of the second aspirator and the intake manifold, the CV valve not regulating flow of vapors between the outlet port of the crankcase and the first aspirator.

The system may further comprise a controller configured with computer readable instructions stored on non-transitory memory for, during a first condition, flowing compressed air from downstream of the compressor to upstream of the compressor through the compressor bypass passage, generating a vacuum at the first aspirator, and using the vacuum to draw fuel vapors from the outlet port of the crankcase into the first aspirator, and during a second condition, flowing air from upstream of the throttle to downstream of the throttle via the throttle bypass passage, generating a vacuum at the second aspirator, and using the vacuum to draw supplementary fuel vapors from the outlet port of the crankcase into the second aspirator, and then into the intake manifold, while continuing to draw fuel vapors from the outlet port of the crankcase into the first aspirator. The first condition may include boosted conditions and intake manifold pressure higher than barometric pressure, and the second condition may include boosted conditions and intake manifold pressure lower than barometric pressure. The fuel vapors flowing into the first aspirator may be directed to an inlet of the compressor before flowing into the intake manifold. Further, during the second condition, additional fuel vapors may also flow from the crankcase directly into the intake manifold via the CV valve while bypassing each of the first aspirator and the second aspirator.

Figure 8:
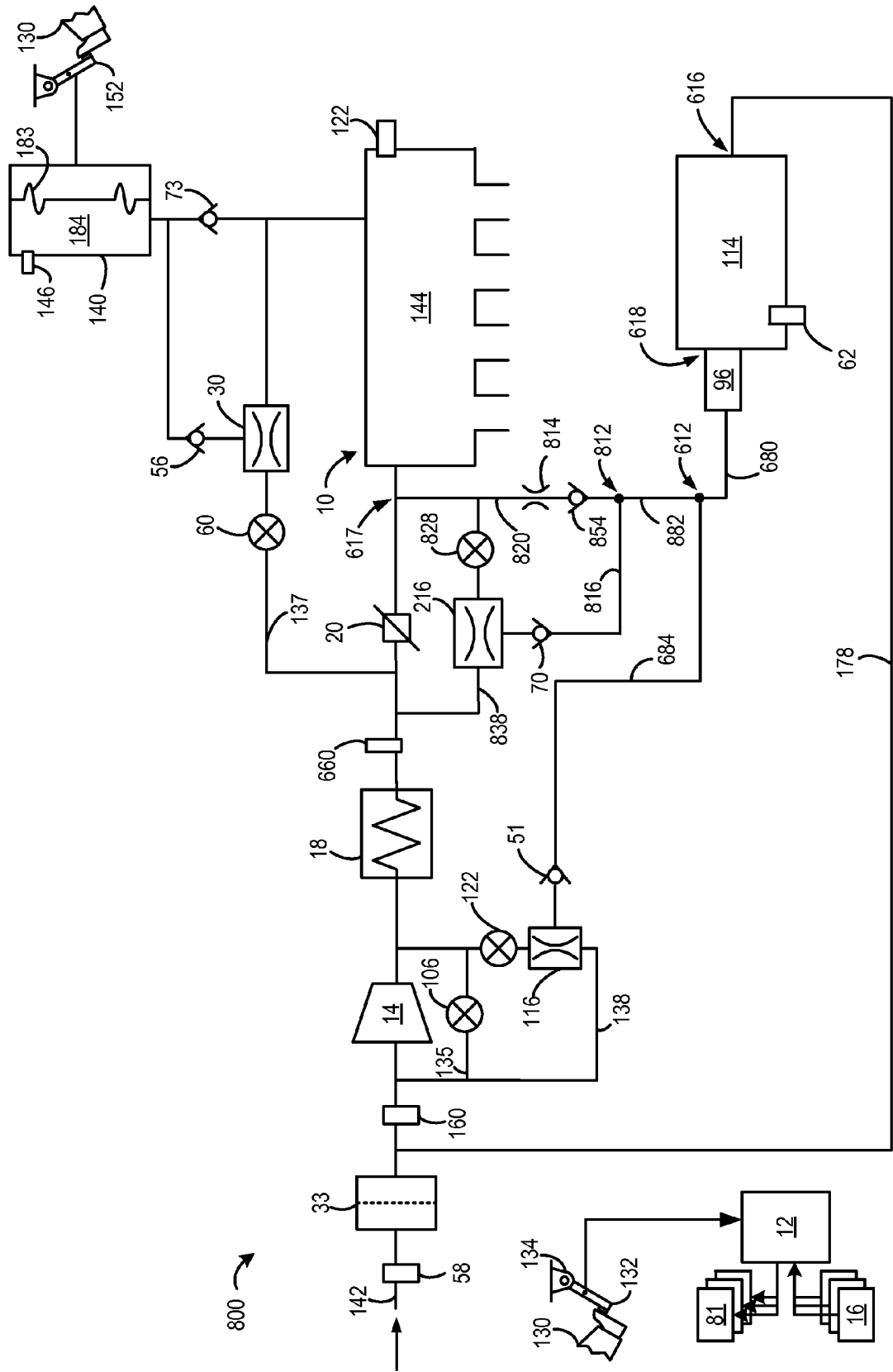

FIG. 8 presents yet another alternative embodiment 800 which is similar to embodiment 700 of FIG. 7 and embodiment 200 of FIG. 2. As such, multiple components depicted in embodiment 800 of FIG. 8 may be similar to those introduced in FIG. 7 and FIG. 2. Accordingly, these components are numbered the same and are not re-introduced.

Embodiment 800 includes second aspirator 216 coupled in throttle bypass 838. Throttle bypass 838 includes throttle bypass valve 828 which may be similar to crankcase ventilation valve 28 of previous embodiments. Thus, throttle bypass flow may be regulated by an opening of throttle bypass valve 828. In one example, such as that described earlier, the opening of throttle bypass valve 828 may vary with a difference in pressure across the throttle bypass valve 828.

Embodiment 800 also includes an orifice 814 coupled along conduit 820 which may regulate flow of fuel vapors along conduit 820. Check valve 854 arranged in series with orifice 814 allows flow of fuel vapors from crankcase 114 towards intake manifold 144 (to location 617) and may block flow from intake manifold 144 towards crankcase 114. As such, orifice 814 may allow a smaller flow rate of fuel vapors during deep vacuum (e.g., higher levels of vacuum) in the intake manifold. In other words, orifice 814 may function as a sonic choke that meters the flow of crankcase gases directly into the intake manifold 144. If orifice 814 is not present, the flow of crankcase gases directly into the intake manifold may become higher than desired whereupon the engine may receive more air and/or more fuel vapor than it requires leading to performance issues. However, if a lower amount of crankcase gases is received into the intake manifold (such as when the orifice 814 is metering crankcase gas flow), a desired air-fuel ratio can be obtained by either opening the throttle 20 for increased air flow rate and/or increasing fuel injection for increased fuel flow rate.

It will be appreciated that in the depicted example embodiment of FIG. 8, throttle bypass valve 828 is positioned downstream of second aspirator 216. By arranging the throttle bypass valve 828 as shown (downstream of second aspirator 216), gases from crankcase 114 may not bypass orifice 814 even when throttle bypass valve 828 is closed. In other words, when throttle bypass valve 828 is closed, vapors from crankcase 114 may not be drawn into second aspirator 216 via check valve 70.

Similar to FIGS. 6 and 7, fuel vapors from the crankcase 114 may flow to first aspirator 116 when the engine is operating boosted (MAP>BP and TIP>BP) while bypassing throttle bypass valve 828. During boosted conditions, there may be no flow of fuel vapors from the crankcase through second aspirator 216, throttle bypass valve 828, or orifice 814. During non-boosted conditions, e.g., TIP=BP and MAP<BP, deeper levels of vacuum may be present in the intake manifold allowing fuel vapors to flow through orifice 814 into intake manifold 144. Additionally, throttle bypass valve 828 may be opened allowing air to flow from upstream of throttle 20 to downstream of throttle 20 through throttle bypass 838 and second aspirator 216. Vacuum generated at second aspirator 216 due to this throttle bypass flow may draw fuel vapors and gases from crankcase 114 into second aspirator 216 and through throttle bypass valve 828 into intake manifold 144 downstream of throttle 20. During non-boosted conditions, fuel vapors from the crankcase may not flow into first aspirator 116.

During lower levels of boost occurring concurrently with shallow levels of intake manifold vacuum, fuel vapors from the crankcase may flow at the same time to each of first aspirator 116, second aspirator 216, and orifice 814. To elaborate, fresh air drawn along vent tube 178 from upstream of compressor 14 into crankcase 114 at inlet port 616 may purge fuel vapors in the crankcase through oil separator 96 at outlet port 618 into first ventilation conduit 680. At node 612, a first portion of fuel vapors (and fresh air) may flow through second ventilation conduit 682 towards first aspirator 116, while remaining portion of fuel vapors flows into conduit 882. Next at node 812, a second portion of fuel vapors may be diverted into conduit 816 towards second aspirator 216, and through throttle bypass valve 828 into intake passage 142 downstream of intake throttle 20 at location 617. Further still, a third portion of fuel vapors (of the remaining portion) at node 812 may flow through orifice 814 and conduit 820 directly into intake manifold 144 at location 617, while bypassing throttle bypass valve 828. During shallow levels of intake manifold vacuum, the orifice 814 may allow a smaller flow rate relative to that at the second aspirator 216 and throttle bypass valve 828. In other words, fuel vapors exiting the crankcase 114 during cruising conditions may be directed to each of the first aspirator 116, the second aspirator 216, and directly into the intake manifold via orifice 814 at the same time.

In this way, fuel vapors in the crankcase may be purged using intake manifold vacuum as well as vacuum generated at each of the first aspirator and the second aspirator. By providing additional vacuum than that available in the intake manifold, the crankcase may be purged more effectively and completely even during shallow levels of intake manifold vacuum.

Thus, an example method for a boosted engine may comprise, during boosted conditions, generating a vacuum at a first ejector using compressor bypass air flow, applying the vacuum to a crankcase to draw fuel vapors into the first ejector, and during cruising conditions and while drawing the vapors to the first ejector, flowing additional fuel vapors from the crankcase to the intake manifold in the first direction via a crankcase ventilation valve. The fuel vapors from the crankcase may be drawn into the first ejector without flowing through the crankcase ventilation valve. Further, cruising conditions may include boosted conditions wherein intake manifold pressure is lower than barometric pressure. In one example, the pressure in the intake manifold may be lower than barometric pressure within a threshold. During cruising conditions, the additional fuel vapors from the crankcase may be routed to the intake manifold directly, e.g., without flowing through an inlet of the compressor. The method may further comprise, during cruising conditions, drawing the additional fuel vapors into a second ejector (e.g., such as second aspirator 216), the second ejector coupled across an intake throttle. Herein, drawing the additional fuel vapors into the second ejector may include using vacuum generated at the second ejector to draw the additional fuel vapors into the second ejector, the vacuum generated via throttle bypass flow through the second ejector. Furthermore, during the cruising conditions, the additional fuel vapors from the crankcase may be routed to the intake manifold via the second ejector. The method may also comprise, during non-boosted conditions, enhancing intake manifold vacuum by drawing vacuum at the second ejector using intake throttle bypass flow, and applying the vacuum to the crankcase for drawing fuel vapors. Additionally, the method may also include during non-boosted conditions, not flowing fuel vapors from the crankcase into the first ejector. Further still, the method may also comprise blocking air flow from the first ejector to the crankcase via a check valve. Herein, fuel vapors flowing to the first ejector and the additional fuel vapors flowing to the intake manifold exit the crankcase via a common outlet, such as oil separator 96 at outlet port 618.

Turning now to FIG. 9, it depicts an example routine 900 illustrating crankcase ventilation during different engine conditions. In particular, routine 900 describes ventilation of the crankcase during conditions the engine is boosted but at lower levels of boost with MAP being lower than barometric pressure. As such, routine 900 will be described with relation to the systems shown in FIGS. 6, 7, and 8, but it should be understood that similar routines may be used with other systems without departing from the scope of this disclosure. Instructions for carrying out routine 900 may be executed by a controller, such as controller 12 of FIG. 1 (and FIGS. 6, 7, and 8), based on instructions stored on a memory of the controller and in conjunction with signals received from sensors of the engine system, such as the sensors described above with reference to FIGS. 1, 6, 7, and 8. The controller may employ engine actuators of the engine system, such as the actuators of FIGS. 1, 6, 7, and 8, to adjust engine operation, according to the routine described below.

At 902, routine 900 estimates and/or measures existing engine operating parameters. These may include, for example, an engine speed, engine temperature, catalyst temperature, MAP, MAF, BP, TIP, etc. Next, at 904, routine 900 may determine if the engine is operating with boosted conditions. Specifically, it may be determined if TIP and MAP are each higher than barometric pressure (BP). If not, the engine may be operating with non-boosted conditions (e.g., wherein TIP is substantially equal to BP and MAP is lower than BP). Accordingly, routine 900 proceeds to 906 to continue to 512 of routine 500 described earlier. As such, intake manifold vacuum (and optionally, vacuum at the second aspirator) may be used to draw fuel vapors from the crankcase and fuel vapor canister. Routine 900 then ends.

If boosted conditions are confirmed at 904, routine 900 continues to 908 to determine if the MAP is lower than BP during boosted conditions. For example, the engine may be operating with lower levels of boost (as measured by the TIP sensor) and a shallow level of vacuum in the intake manifold (as measured by the MAP sensor). As such, the engine may be cruising.

If not, routine 900 progresses to 910 to determine that the engine is operating under boosted conditions with MAP higher than BP. Accordingly, at 912, routine 900 continues to 508 of routine 500 described earlier. Herein, vacuum may be generated at the first aspirator by flowing boosted air through the first aspirator, and this vacuum may be applied to the crankcase and the canister to draw fuel vapors into the first aspirator. These fuel vapors may be directed at first to the inlet of the compressor and then into the intake manifold. Routine 900 then ends.

If, however, it is determined at 908, that MAP is lower than BP while boosted operation occurs (e.g., TIP is higher than BP), routine 900 progresses to 914 wherein crankcase vapors (e.g. fuel vapors in crankcase, also termed crankcase gases) are streamed to each of the inlet of the compressor and directly into the intake manifold at the same time, as described earlier in reference to FIG. 6. Specifically, at 916, intake manifold vacuum may be utilized to draw fuel vapors from the crankcase into the intake manifold directly, such as via third ventilation conduit 682 of FIG. 6. Simultaneously, at 918, boosted air may be streamed through first aspirator 116 via first conduit 138 to generate a vacuum at the first aspirator. In one example, the compressor bypass valve may be opened to allow compressed air to flow into first conduit 138. Vacuum drawn at the first aspirator 116 may be employed to draw crankcase gases into the first aspirator and then these fuel vapors may be directed to the compressor inlet, upstream of compressor 14. As such, fuel vapors drawn from the crankcase to the first aspirator bypass (e.g., do not flow through) the crankcase ventilation valve. However, crankcase gases flowing directly into the intake manifold via third ventilation conduit 682 flow through the crankcase ventilation valve.

At 920, in the alternate embodiments depicted in FIGS. 7 and 8, shallow intake manifold vacuum may be enhanced by flowing a portion of intake air from upstream of intake throttle 20 through throttle bypass 238 (or throttle bypass 838 and throttle bypass valve 828 in FIG. 8) and through second aspirator 216. Next, at 922, vacuum generated at second aspirator 216 by throttle bypass flow in conduit 238 (and throttle bypass 838 in FIG. 8) may be used to draw a portion of crankcase vapors from the crankcase into the second aspirator. Further, fuel vapors drawn into the second aspirator may then be directed to intake manifold 144. In addition to fuel vapors being drawn into second aspirator, the intake manifold vacuum may also draw additional fuel vapors directly into the intake manifold, e.g. past check valve 54 along conduit 738 in FIG. 7 or through orifice 814 in FIG. 8. As mentioned earlier, the portion of fuel vapors flowing into the second aspirator and then to intake manifold 144 flow through the crankcase ventilation valve. Routine 900 then ends.

Thus, an example method for a boosted engine may comprise, when the engine is operating boosted, drawing a first portion of fuel vapors from a first port (e.g., outlet port 618) of a crankcase into a first aspirator (e.g., first aspirator 116) coupled in a compressor bypass passage, the fuel vapors bypassing a crankcase ventilation (CV) valve, and when pressure in an intake manifold is lower than barometric pressure while the engine is boosted, using vacuum in the intake manifold to draw a second portion of fuel vapors from the first port of the crankcase directly into the intake manifold (e.g., through third ventilation conduit 682 in FIG. 6, through conduit 738 in FIG. 7, or through orifice 814 in FIG. 8), and drawing a third portion of fuel vapors from the first port of the crankcase into a second aspirator (such as second aspirator 216) coupled in a throttle bypass passage, the third portion of fuel vapors flowing through the second aspirator into the intake manifold. The second portion of fuel vapors may not flow through either the first aspirator or the second aspirator, and wherein each of the second portion of fuel vapors and third portion of fuel vapors may flow through the CV valve, as shown in FIG. 7.

The first portion of fuel vapors flowing into the first aspirator may be directed to a compressor inlet and then into the intake manifold, while each of the second portion of fuel vapors and the third portion of fuel vapors may enter the intake manifold without being directed to the compressor inlet. A vacuum may be generated at the first aspirator by flowing air through the compressor bypass passage and through the first aspirator, and wherein, a vacuum may be generated at the second aspirator by flowing air through the throttle bypass passage and through the second aspirator. The method may further comprise, when the engine is not boosted and the pressure in the intake manifold is lower than barometric pressure, not flowing the first portion of fuel vapors to the first aspirator, but continuing to flow the second portion of fuel vapors and third portion of fuel vapors from the crankcase. The method may also comprise, during boosted conditions and when intake manifold pressure is higher than barometric pressure, not flowing fuel vapors or air through the crankcase ventilation valve. Specifically, neither the second portion of fuel vapors nor the third portion of fuel vapors may flow through the crankcase ventilation valve during boosted conditions when MAP>BP. Further, during boosted conditions and when intake manifold pressure is higher than barometric pressure, only the first portion of fuel vapors may flow to the first aspirator.

Referring now to FIG. 10, it portrays map 1000 depicting an example fuel vapor flow from crankcase during various engine conditions. Map 1000 includes crankcase ventilation (CV) flow directly into intake manifold (IM) at plot 1002, CV flow into second aspirator at plot 1004, CV into first aspirator at plot 1006, variation in throttle inlet pressure (also termed, boost pressure) at plot 1008 (small dashes), variation in pressure in the intake manifold (MAP) at plot 1010 (solid line), engine speed at plot 1012, and a position of the accelerator pedal at plot 1014. Line 1007 represents barometric pressure (BP). Thus, the variations in throttle inlet pressure (TIP) and MAP are depicted relative to each other and BP. The above plots are plotted along the y-axes while time is plotted along the x-axis. Further, time increases from the left hand side of the x-axis to the right hand side of the x-axis. The example depicted in FIG. 10 may be in reference to the systems shown in FIG. 7 (and/or FIG. 8).

Between t0 and t1, the engine may be idling as the pedal is fully released. Accordingly, MAP (solid line of plot 1010) may be significantly lower than BP while throttle inlet pressure may be substantially similar to BP. Between t0 and t1, boost pressure may not be produced and therefore, there may be no CV flow to the first aspirator. However, a smaller rate of fuel vapor flow may occur directly into the intake manifold and the second aspirator as indicated by dashed portions 1003 and 1005 in plots 1002 and 1004, respectively. Dashed portions of plots 1002 and 1004 may indicate a lower flow rate as compared to the solid portion of plots 1002 and 1004. Since the engine is idling, deeper manifold vacuum is present and the crankcase ventilation valve may allow a significantly smaller rate of flow therethrough. As such, during idle the engine may not desire additional fuel vapors from sources such as the crankcase or canister. Accordingly, supplementary fuel flow from the crankcase may be significantly reduced during idle conditions.

At t1, a tip-in condition may occur with a sudden increase in torque demand as the operator depresses the pedal completely. For example, the vehicle may be accelerated to merge with traffic on a highway. In response to the increase in torque demand, the engine speed may rise sharply (plot 1012) as does the throttle inlet pressure (plot 1008). Manifold pressure may also be higher than BP during these boosted conditions. Accordingly, crankcase ventilation flow may be drawn into the first aspirator at t1 as the first aspirator generates vacuum during the boosted conditions. Since MAP is higher than BP, there may be no crankcase ventilation flow through either the second aspirator or directly into the IM.

Between t1 and t2, boosted conditions continue where the MAP is greater than BP. Between t1 and t2, the engine speed may gradually lower such that at t2, cruising conditions may be attained wherein lower boost levels are generated. Further still, at t2, MAP reduces below BP. As such, MAP may be lower than BP by a threshold amount. Accordingly, crankcase ventilation flow directly into the IM may now occur along with crankcase ventilation (CV) flow into the second aspirator at the same time. Specifically, vacuum generated at the first aspirator 116 may draw gases from the crankcase to the inlet of the compressor 14 while vacuum generated at the second aspirator 216 may draw additional vapors into the second aspirator 216 and thereon into intake manifold at location 617. At the same time, the shallow intake manifold vacuum may draw additional crankcase gases directly into the intake manifold (e.g., via conduit 738 of FIG. 7 or via orifice 814 of FIG. 8). Thus, between t2 and t3, when lower boost levels are present along with shallow intake manifold vacuum, crankcase ventilation flow may occur to each of the first aspirator, the second aspirator, and directly into the IM.

At t3, the pedal may be released gradually and the engine speed may reduce until the engine is idling again. For example, the vehicle may be exiting the highway. Similar to the time between t0 and t1, crankcase ventilation flow to the first aspirator may now be discontinued as boost pressure is substantially absent between t3 and t4. However, as between t0 and t1, a smaller amount of crankcase ventilation flow may occur to the second aspirator and directly into the IM, as shown by the dashed portions of the plots of 1004 and 1002 respectively.

At t4, the accelerator pedal may be depressed gradually resulting in a smaller increase in torque demand relative to that for the tip-in at t1. Herein, engine speed may rise to a smaller amount and level out while a smaller amount of boost pressure is produced at t4. For example, the vehicle may be traveling on city streets. Herein, between t4 and t5, a smaller level of boost may be provided. Since MAP is higher than BP between t4 and t5, crankcase ventilation flow may not occur to either the second aspirator or directly into the IM. However, fuel vapors from the crankcase may flow to the first aspirator. At t5, engine speed may reduce as the pedal is released slightly. In response, throttle inlet pressure is significantly reduced (e.g., TIP may be substantially equal to BP, as shown) and MAP is lower than BP. The engine may be operating under non-boosted conditions from t5. Accordingly, vacuum may not be generated at the first aspirator and crankcase ventilation to the first aspirator may no longer occur. However, fuel vapors from the crankcase may now be drawn into the second aspirator and directly into the intake manifold.

In this way, crankcase ventilation may be enhanced during different engine conditions. During boosted conditions, vacuum generated by compressor bypass flow through the first aspirator may be harnessed to draw fuel vapors from the crankcase. During non-boosted conditions, intake manifold vacuum may be enhanced by a second aspirator to purge the crankcase more efficiently. Further, during conditions when a lower level of boost is present along with shallower levels of intake manifold vacuum, the crankcase may be purged to each of the first aspirator, the second aspirator (when present), and directly into the intake manifold. Fuel vapors directed to the first aspirator may bypass the crankcase ventilation valve enabling a lower restriction on crankcase ventilation. The technical effect of providing multiple paths for fuel vapor purge of the crankcase is that the crankcase may be cleaned out more effectively and constantly. By flowing fuel vapors out of the crankcase in a single direction out of a common outlet port during all engine conditions, system complexity may be reduced and component reduction benefits are achieved. As such, expenses may be reduced. Overall, emissions performance is improved without reducing fuel economy.

In another representation, an example system may comprise, an engine including an intake manifold, a compressor positioned in an intake passage for providing a boosted aircharge, a compressor bypass passage coupled around the compressor, the compressor bypass passage including a compressor bypass valve, a first aspirator coupled to the compressor bypass passage, a throttle coupled in the intake passage, a throttle bypass passage coupled around the throttle, the throttle bypass passage including a throttle bypass valve, a second aspirator coupled to the throttle bypass passage, a crankcase, an outlet port of the crankcase coupled fluidically to each of the first aspirator via a first passage, the second aspirator via a second passage, and the intake manifold via a third passage, and an orifice positioned in the third passage regulating flow from the outlet port of the crankcase to the intake manifold. The system may also include a crankcase ventilation (CV) valve in the throttle bypass passage regulating flow in the throttle bypass passage, the CV valve not regulating flow of vapors between the outlet port of the crankcase and the first aspirator, and the CV valve not regulating flow of vapors between the outlet port of the crankcase and the orifice.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
during boosted conditions,
generating a vacuum at a first ejector using compressor bypass air flow; and
applying the vacuum to a crankcase to draw fuel vapors into the first ejector;
during cruising conditions and while drawing the fuel vapors to the first ejector,
flowing additional fuel vapors from the crankcase to an intake manifold via a crankcase ventilation valve and drawing the additional fuel vapors into a second electror, the second electror coupled across an intake throttle.

2. The method of claim 1, wherein fuel vapors from the crankcase are drawn into the first ejector without flowing through the crankcase ventilation valve.

3. The method of claim 1, wherein cruising conditions include boosted conditions with intake manifold pressure lower than barometric pressure.

4. The method of claim 3, wherein during cruising conditions, a portion of the additional fuel vapors from the crankcase is routed to the intake manifold directly.

5. The method of claim 1, wherein drawing the additional fuel vapors into the second ejector includes using vacuum generated at the second ejector to draw the additional fuel vapors into the second ejector, the vacuum generated via throttle bypass flow through the second ejector.

6. The method of claim 1, wherein during the cruising conditions, the additional fuel vapors from the crankcase are routed to the intake manifold via the second ejector.

7. The method of claim 1, further comprising during non-boosted conditions, enhancing intake manifold vacuum by drawing vacuum at the second ejector using intake throttle bypass flow, and applying the vacuum to the crankcase for drawing fuel vapors.

8. The method of claim 7, further comprising during non-boosted conditions, not flowing fuel vapors from the crankcase into the first ejector.

9. The method of claim 1, further comprising blocking air flow from the first ejector to the crankcase via a check valve.

10. The method of claim 1, wherein the fuel vapors flowing to the first ejector and the additional fuel vapors flowing to the intake manifold exit the crankcase via a common outlet.

11. A method for an engine that is boosted, comprising:
when the engine is operating boosted, drawing a first portion of fuel vapors from a first port of a crankcase into a first aspirator coupled in a compressor bypass passage, the first portion of fuel vapors bypassing a crankcase ventilation (CV) valve; and
when pressure in an intake manifold is lower than barometric pressure while the engine is boosted,
using vacuum in the intake manifold to draw a second portion of fuel vapors from the first port of the crankcase directly into the intake manifold; and
drawing a third portion of fuel vapors from the first port of the crankcase into a second aspirator coupled in a throttle bypass passage, the third portion of fuel vapors flowing through the second aspirator into the intake manifold.

12. The method of claim 11, wherein the second portion of fuel vapors does not flow through either the first aspirator or the second aspirator, and wherein each of the second portion of fuel vapors and third portion of fuel vapors flows through the CV valve.

13. The method of claim 11, wherein the first portion of fuel vapors flowing into the first aspirator is directed to a compressor inlet and then into the intake manifold, and wherein the second portion of fuel vapors and the third portion of fuel vapors enter the intake manifold without being directed to the compressor inlet.

14. The method of claim 11, wherein a vacuum is generated at the first aspirator by flowing air through the compressor bypass passage and through the first aspirator, and wherein, a vacuum is generated at the second aspirator by flowing air through the throttle bypass passage and through the second aspirator.

15. The method of claim 11, further comprising when the engine is not boosted and the pressure in the intake manifold is lower than barometric pressure, not flowing the first portion of fuel vapors to the first aspirator, but continuing to flow the second portion of fuel vapors and third portion of fuel vapors from the crankcase.

16. The method of claim 11, further comprising, during boosted conditions and when intake manifold pressure is higher than barometric pressure, not flowing fuel vapors or air through the CV valve.

17. A system, comprising:
an engine including an intake manifold;
a compressor positioned in an intake passage for providing a boosted aircharge;
a compressor bypass passage coupled around the compressor, the compressor bypass passage including a compressor bypass valve;
a first aspirator coupled to the compressor bypass passage;
a throttle coupled in the intake passage;
a throttle bypass passage coupled around the throttle, the throttle bypass passage including a throttle bypass valve;
a second aspirator coupled to the throttle bypass passage;
a crankcase;
an outlet port of the crankcase coupled fluidically to each of the first aspirator, the second aspirator, and the intake manifold;
a crankcase ventilation (CV) valve regulating flow between the outlet port of the crankcase and each of the second aspirator and the intake manifold, the CV valve not regulating flow of vapors between the outlet port of the crankcase and the first aspirator.

18. The system of claim 17, further comprising a controller configured with computer readable instructions stored on non-transitory memory for:
during a first condition, flowing compressed air from downstream of the compressor to upstream of the compressor through the compressor bypass passage;
generating a vacuum at the first aspirator; and
using the vacuum to draw fuel vapors from the outlet port of the crankcase into the first aspirator; and
during a second condition,
flowing air from upstream of the throttle to downstream of the throttle via the throttle bypass passage;
generating a vacuum at the second aspirator; and
using the vacuum to draw supplementary fuel vapors from the outlet port of the crankcase into the second aspirator, and then into the intake manifold, while continuing to draw fuel vapors from the outlet port of the crankcase into the first aspirator.

19. The system of claim 18, wherein the first condition includes boosted conditions and intake manifold pressure higher than barometric pressure, and wherein the second condition includes boosted conditions and intake manifold pressure lower than barometric pressure.

* * * * *